(12) United States Patent
Suga

(10) Patent No.: US 6,827,458 B2
(45) Date of Patent: Dec. 7, 2004

(54) PLANAR LIGHT SOURCE DEVICE

(75) Inventor: Yoshinori Suga, Yokkaichi (JP)

(73) Assignees: Mitsubishi Chemical Corporation, Tokyo (JP); Yukadenshi Co., Ltd., Tokyo (JP)

(*) Notice: Subject to any disclaimer, the term of this patent is extended or adjusted under 35 U.S.C. 154(b) by 90 days.

(21) Appl. No.: 10/093,416

(22) Filed: Mar. 11, 2002

(65) Prior Publication Data
US 2002/0135996 A1 Sep. 26, 2002

Related U.S. Application Data

(63) Continuation of application No. PCT/JP01/05946, filed on Jul. 9, 2001, now abandoned.

(30) Foreign Application Priority Data

| Jul. 11, 2000 | (JP) | 2000-209914 |
| Aug. 8, 2000 | (JP) | 2000-240336 |
| Aug. 8, 2000 | (JP) | 2000-240337 |
| Aug. 8, 2000 | (JP) | 2000-240338 |
| Oct. 20, 2000 | (JP) | 2000-320471 |
| Nov. 21, 2000 | (JP) | 2000-354497 |
| Feb. 27, 2001 | (JP) | 2001-052650 |

(51) Int. Cl.[7] .................................. F21V 7/04
(52) U.S. Cl. ..................... 362/31; 362/26; 349/65; 385/146
(58) Field of Search ................. 362/31, 26, 27; 349/65; 385/146

(56) References Cited

U.S. PATENT DOCUMENTS 5,818,555 A 10/1998 Yokoyama et al.

FOREIGN PATENT DOCUMENTS

| JP | 10-247062 | 9/1998 |
| JP | 11-052370 | 2/1999 |
| JP | 11-231315 | 8/1999 |
| JP | 11-258602 | 9/1999 |
| JP | 11-326898 | 11/1999 |
| JP | 2000-147264 | 5/2000 |
| TW | 322 534 | 11/1997 |

Primary Examiner—Stephen F. Husar
(74) Attorney, Agent, or Firm—Oblon, Spivak, McClelland, Maier & Neustadt, P.C.

(57) ABSTRACT

A planar light source device including a light guide pipe with one surface thereof serving as a light radiation surface, a light extracting mechanism provided to the light guide pipe, a light source provided to a side edge portion of the light guide pipe, and a light reflection sheet arranged to an opposite surface side from the light radiation surface of the light guide pipe such that the light extracting mechanism serves as a mechanism for radiating out, toward the light reflection sheet side, at least 65% or more of light beams radiated out from the light guide pipe, and the light reflection sheet is formed with an arrangement of multiple substantially identical and/or substantially similar base units composed of sloped reflection surfaces at a pitch of 5000 μm or less.

9 Claims, 36 Drawing Sheets

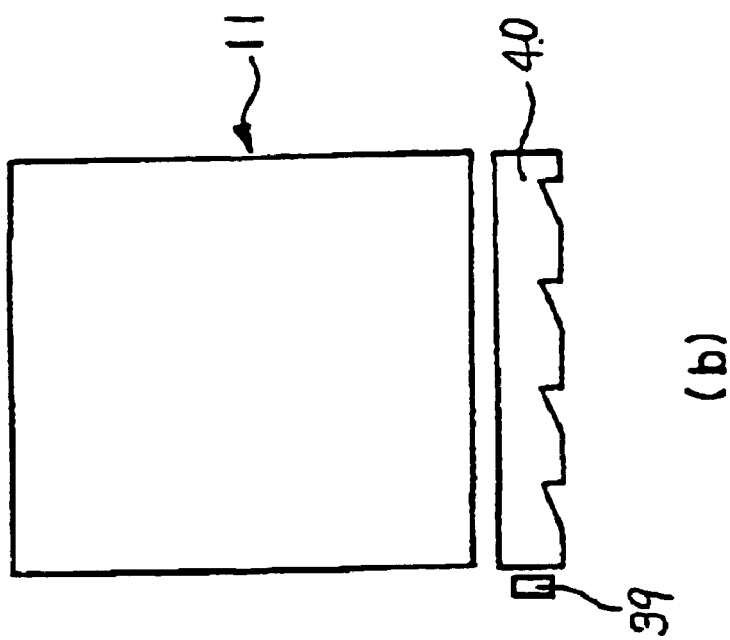
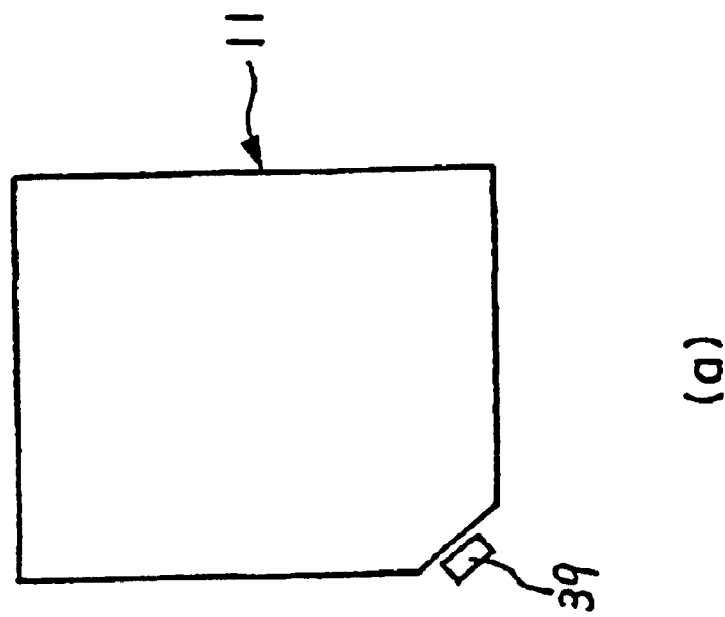
FIG. 3

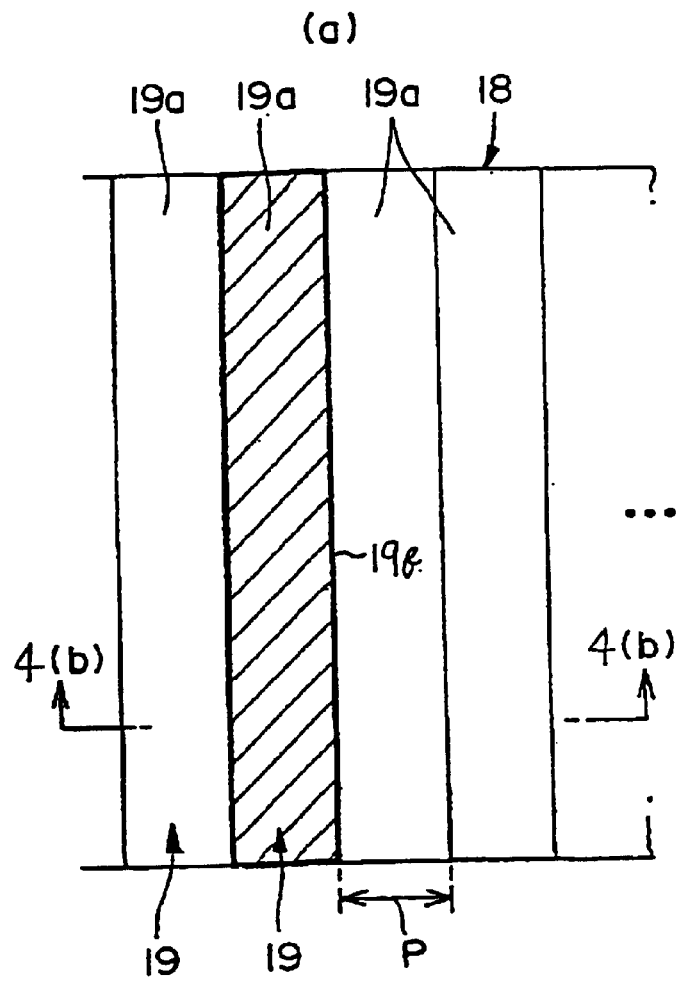
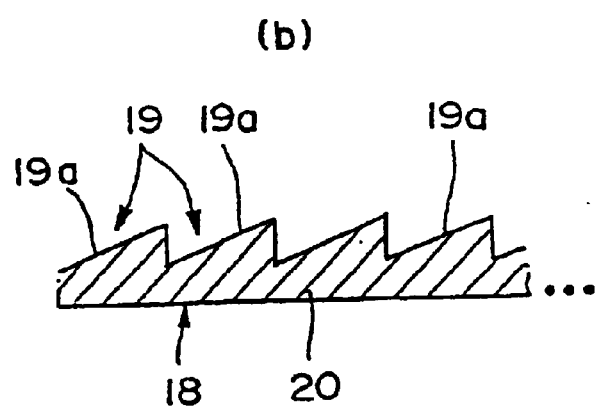
FIG. 4

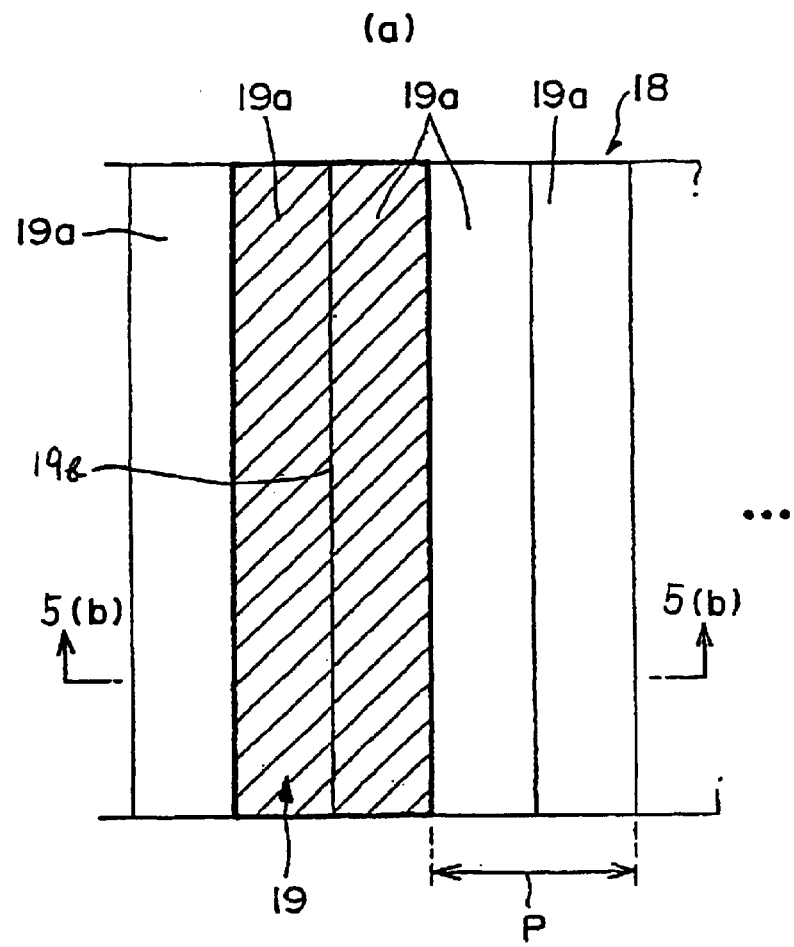
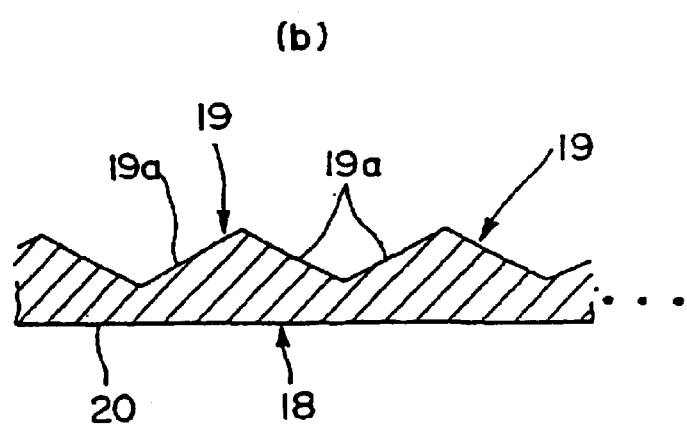
FIG. 5

(a)
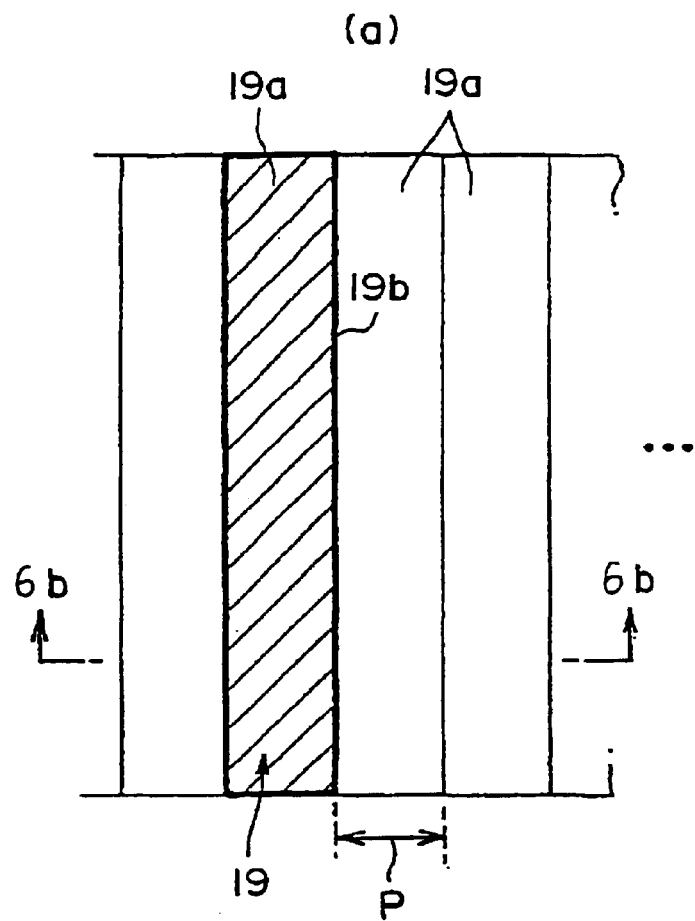
(b)
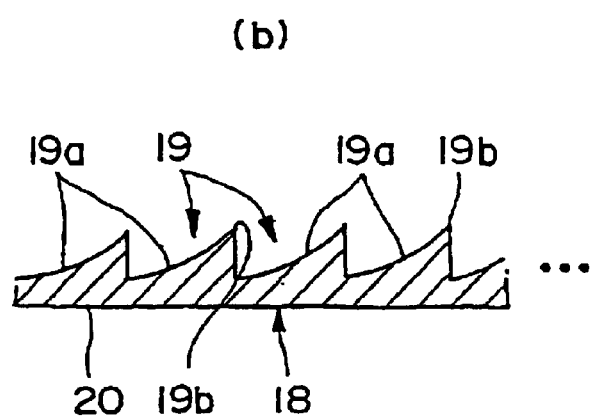
FIG. 6

(a)
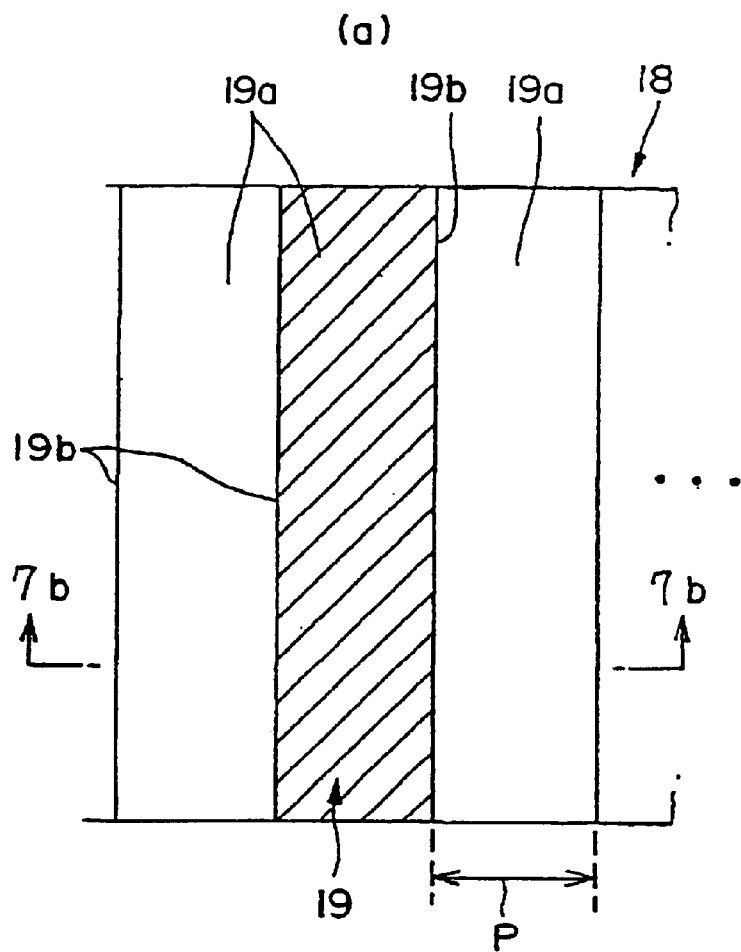
(b)
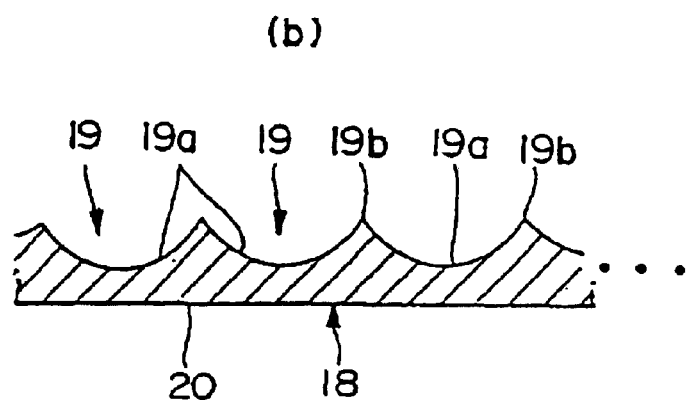
FIG. 7

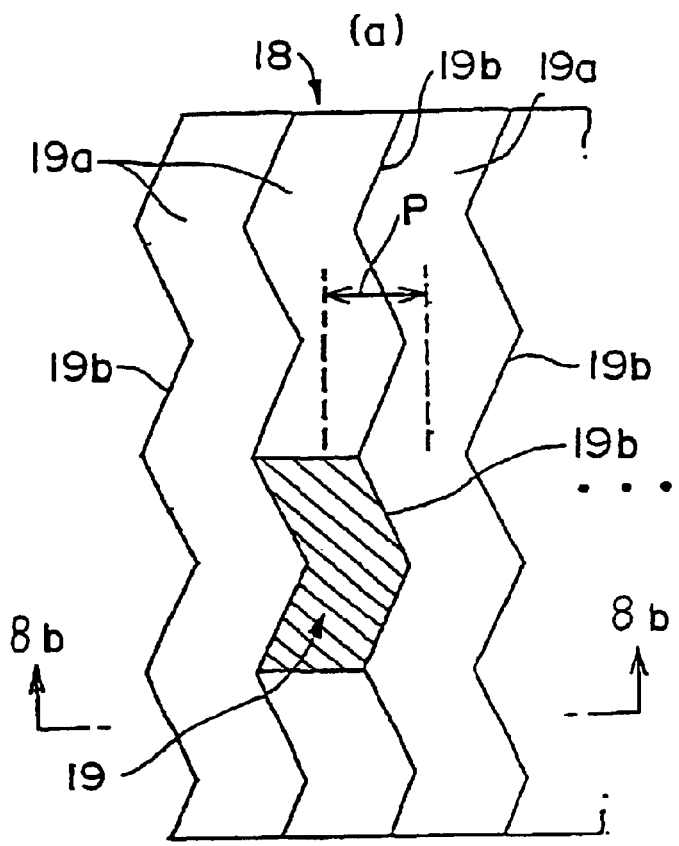
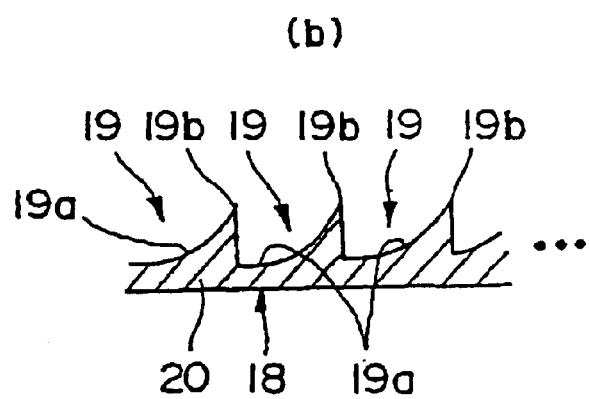
FIG. 8

(a)
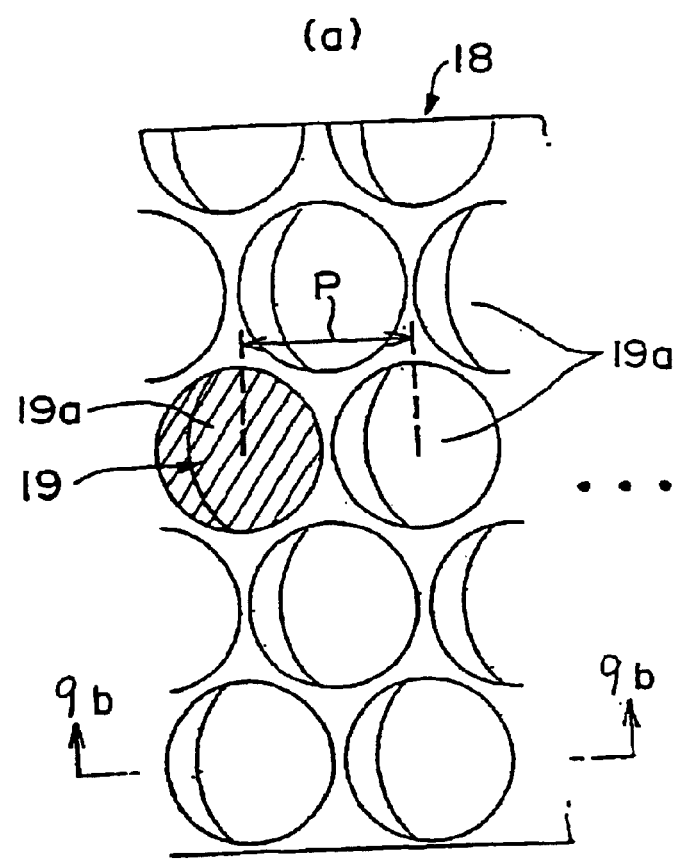
(b)
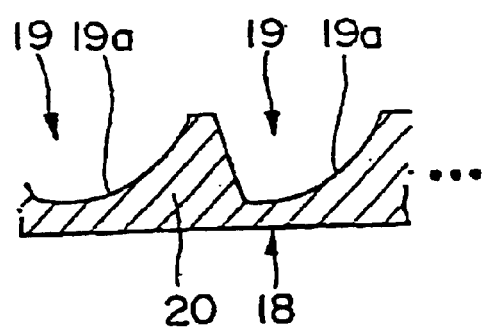
FIG. 9

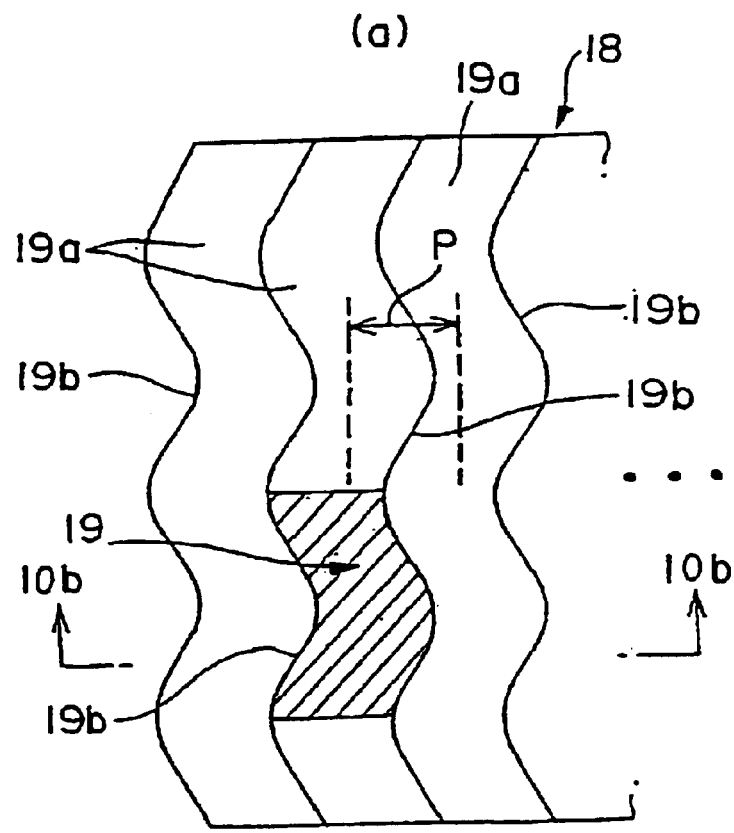
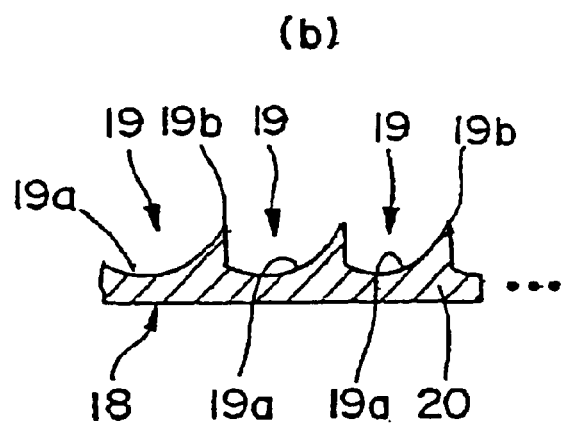
FIG. 10

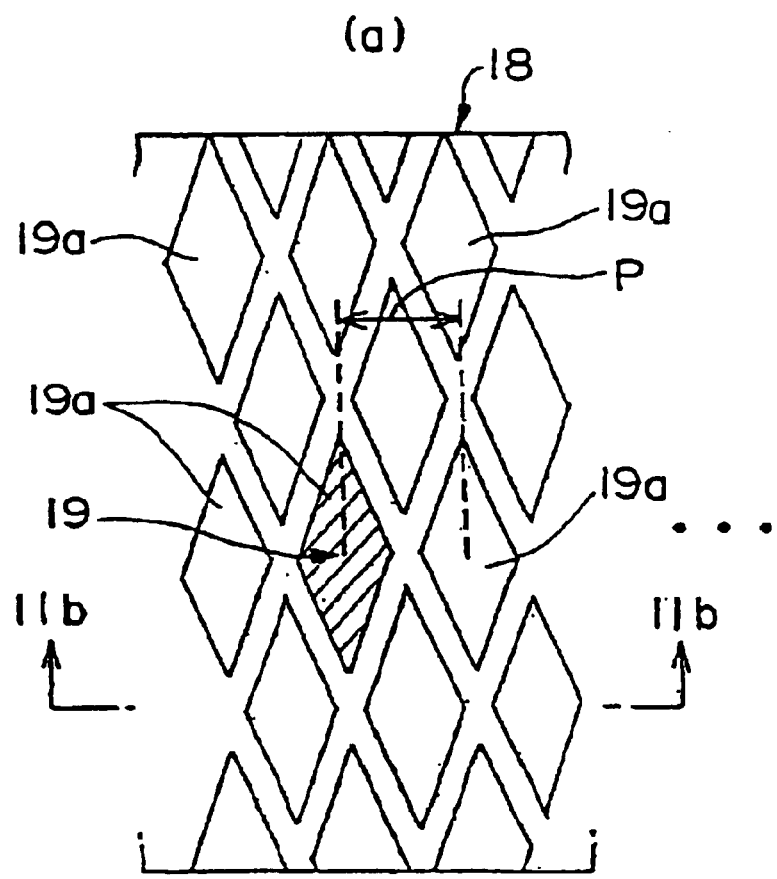
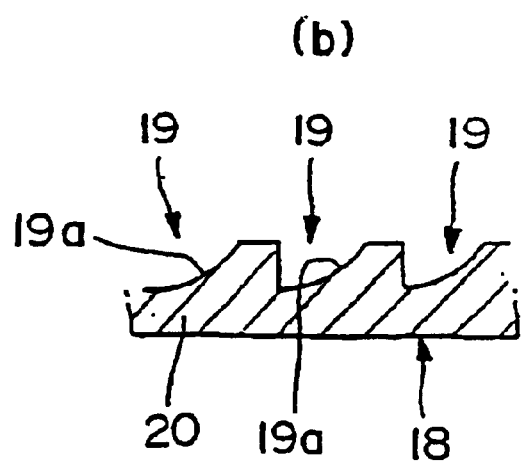
FIG. 11

(a)
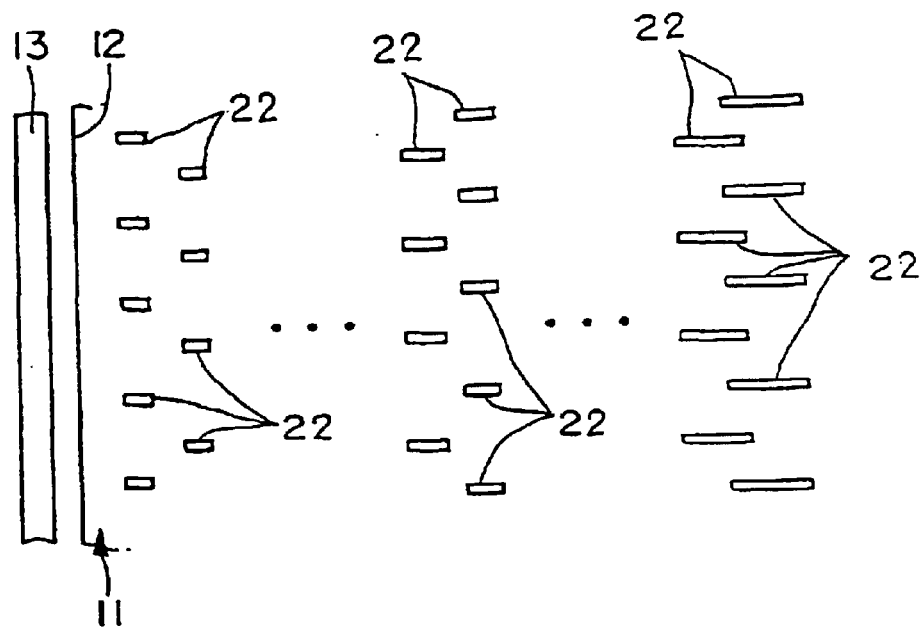
(b)
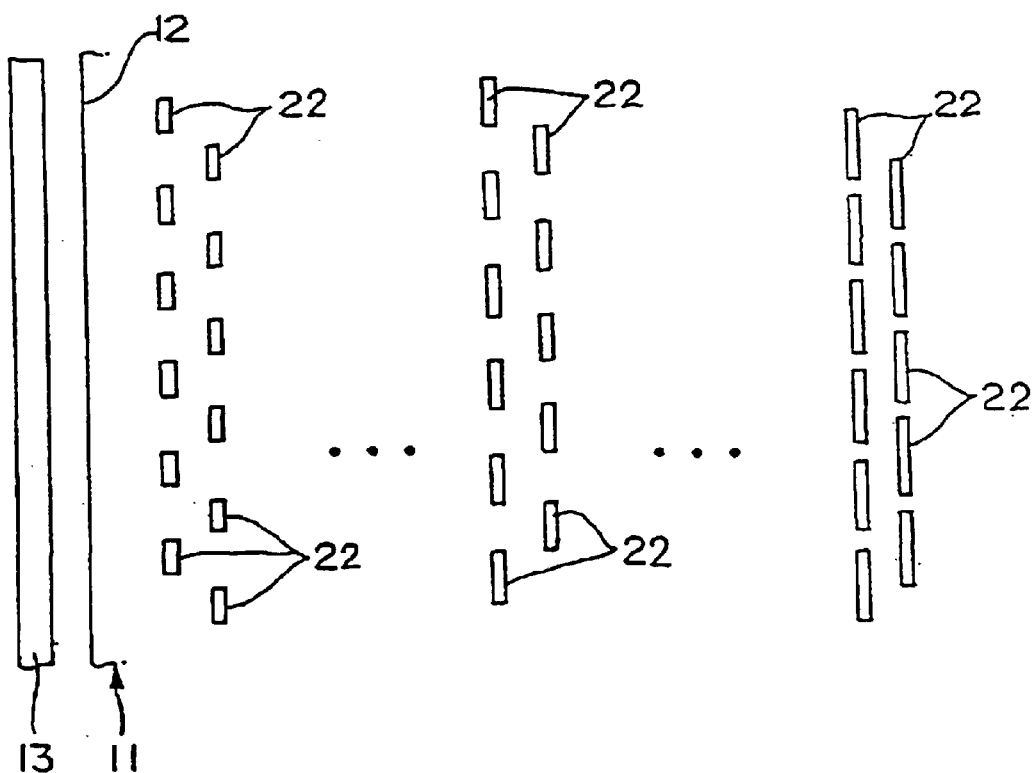
FIG. 27

(a)
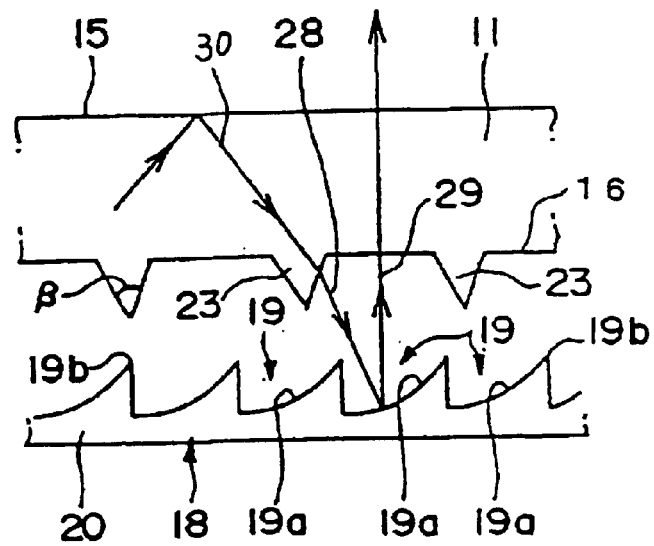
(b)
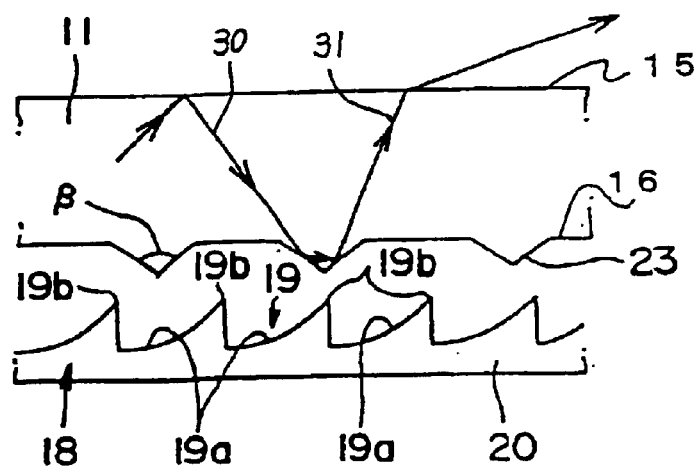
FIG. 29

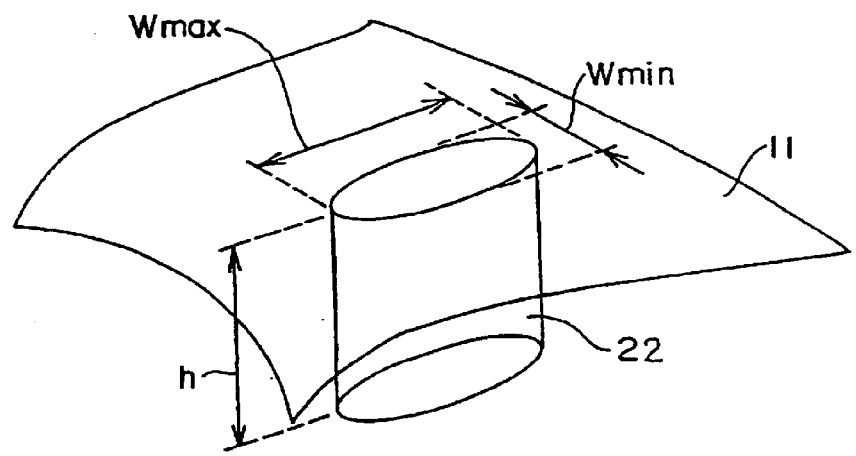
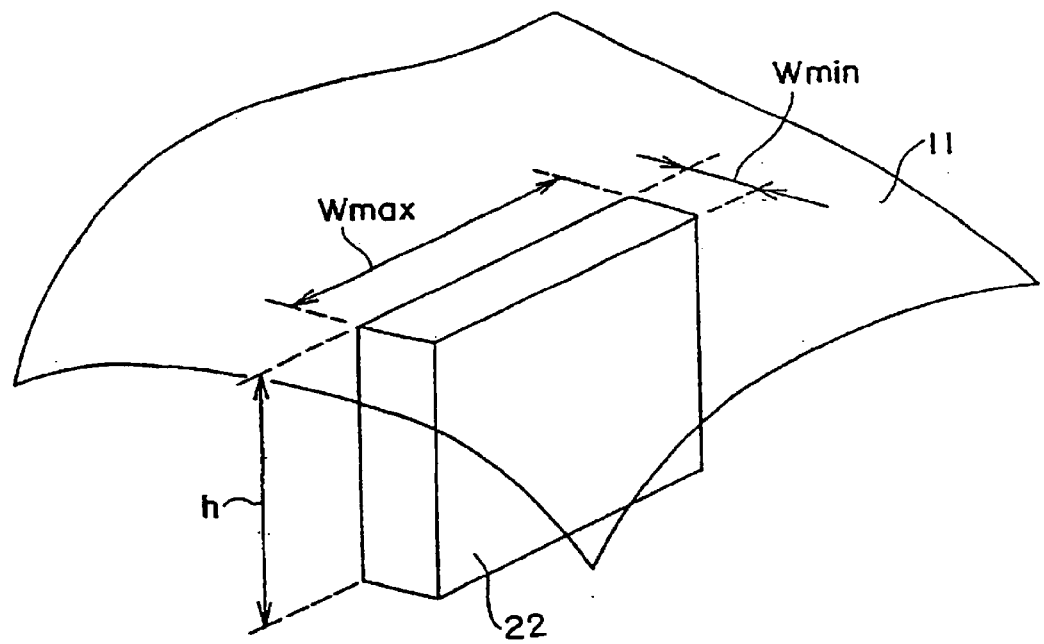
FIG. 30

(a)
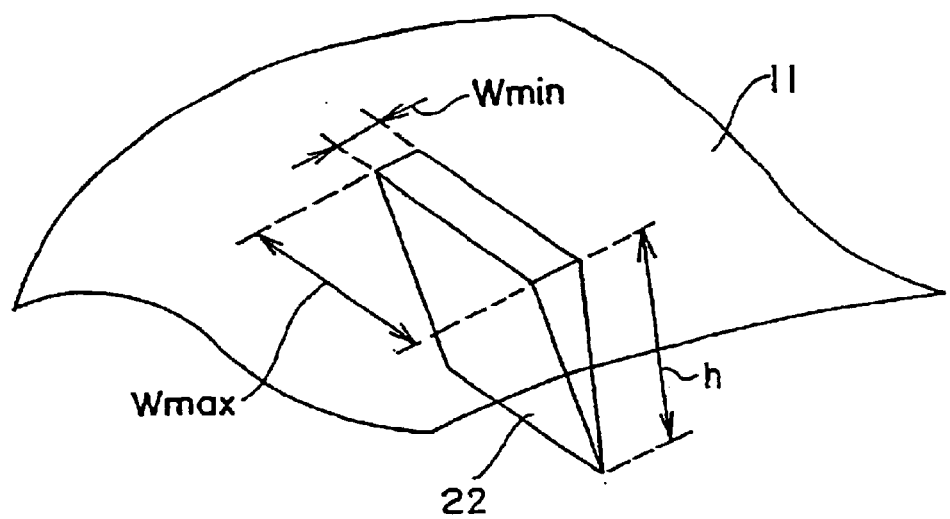
(b)
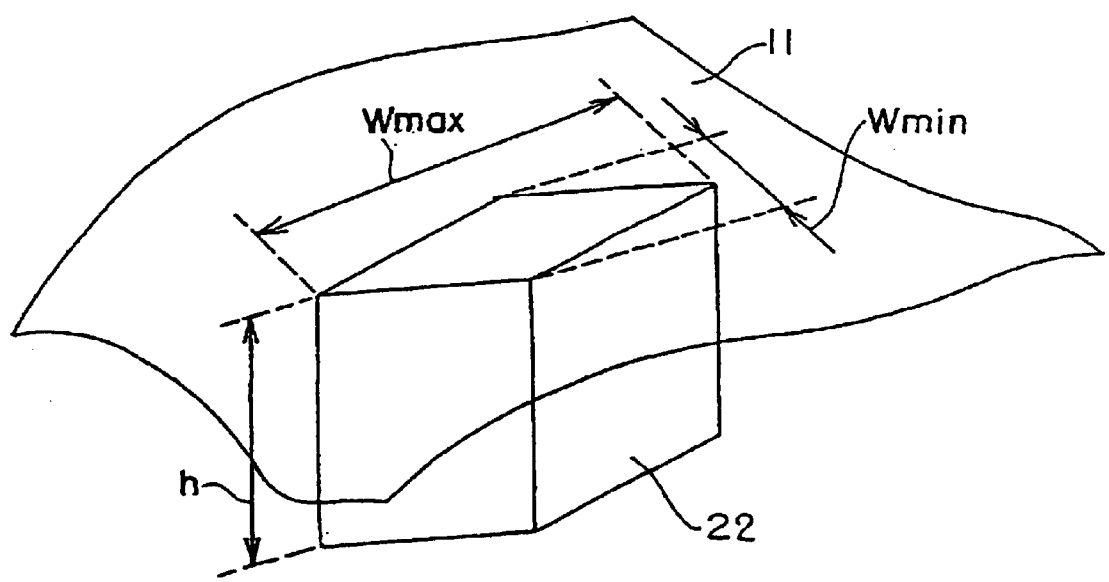
FIG. 31

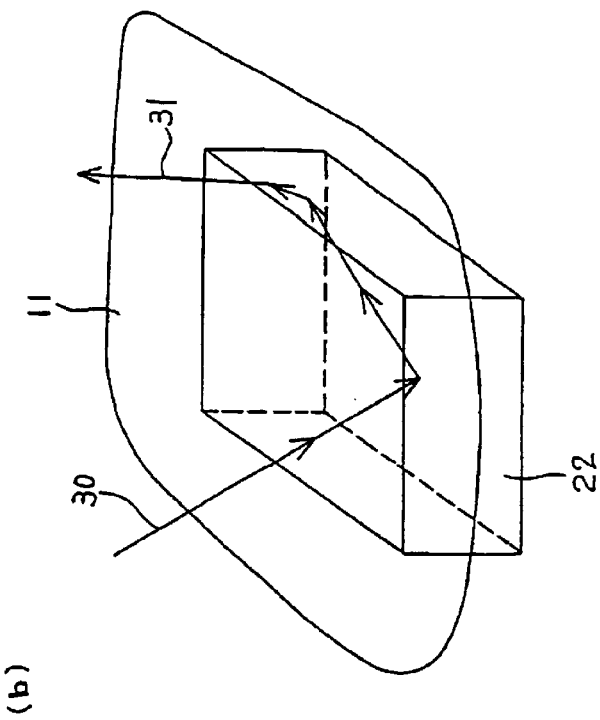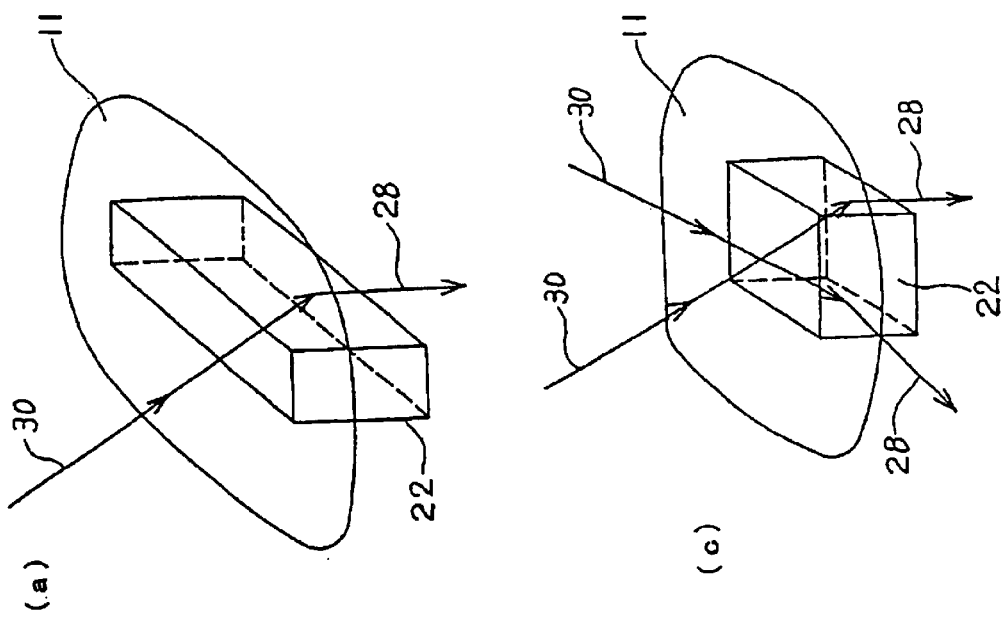
FIG. 32

(a)
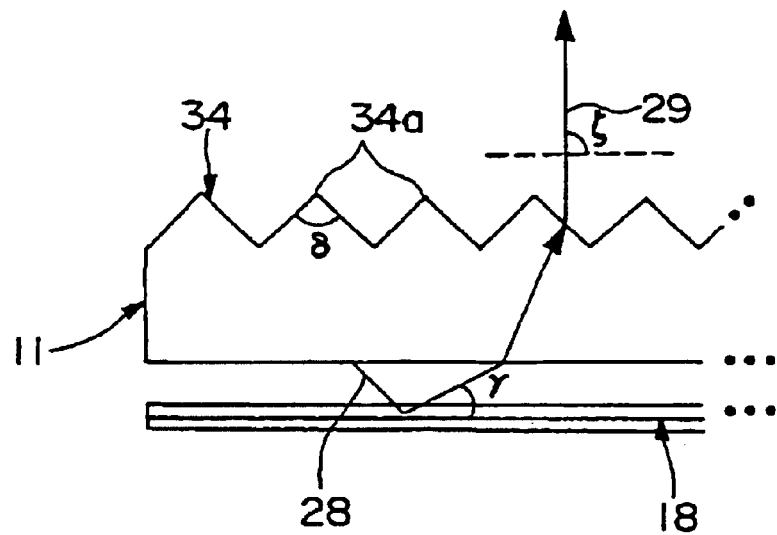
(b)
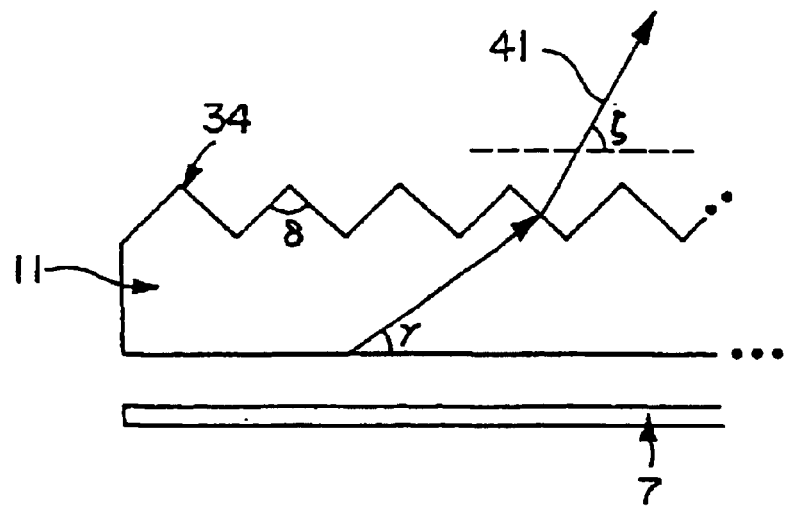
FIG. 40

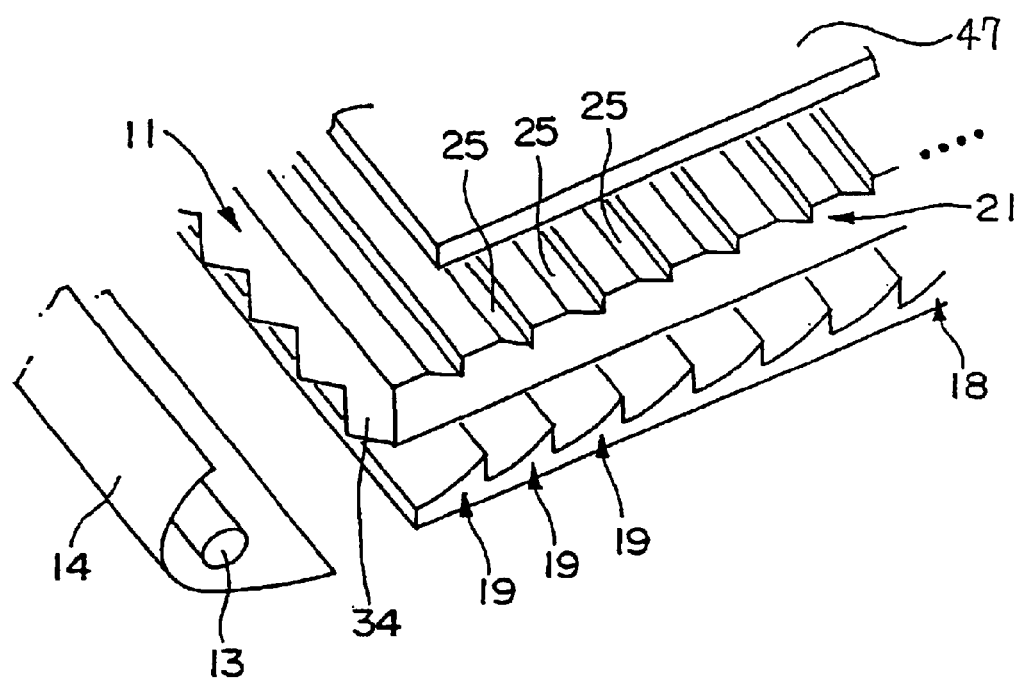
F I G. 4 1

PLANAR LIGHT SOURCE DEVICE

This is a continuation of Application PCT/JP 01/05946, filed on Jul. 9, 2001, now abandoned.

TECHNICAL FIELD

The present invention pertains to a planar light source device, and more particularly to a planar light source device utilizes a novel light guide pipe and light reflection sheet that are employed particularly favorably in an illumination optical system, and can be used favorably as a backlight optical system of a liquid crystal display device.

BACKGROUND ART

Recently, transmission-type liquid crystal display devices are frequently used as display devices in monitors designed for personal computers and in thin televisions and the like. In such liquid crystal displays, on a rear side of a liquid crystal element, there is normally arranged an illumination device, namely a backlight (a planar light source device). The planar light source device serves as a mechanism for converting a linear light source such as a cold cathode discharge tube, for example, into surface light.

Specifically, a method in which the light source is arranged directly below the rear side of the liquid crystal element, and a method in which the light source is arranged to a side surface and an acrylic plate or other such translucent light guide pipe is used to convert the light to the surface form to thus obtain the surface light source (a side light method), are representative. On a light radiation surface there is arranged an optical element composed of a prism array or the like, and this serves as a mechanism for obtaining desired optical characteristics.

In the conventional planar light source device using the side light method, as shown in FIG. 44, on one side edge or a substrate which is the light guide pipe 1 and is composed of a translucent plate, there is arranged a linear light source 2 arranged such that it lies along an end surface 1a of the side edge portion, and a reflector 3 is attached so as to cover the light source 2. This serves as a mechanism in which direct light from the linear light source 2 and light reflected by the reflector 3 enter the light guide pipe 1, into an inner portion thereof, from a light incidence end surface which is the side edge portion surface 1a.

One surface 1b of the light guide pipe 1 serves as a light radiation surface, and on this light radiation surface 1b there is arranged a light modulation sheet 5, on which is formed an array 4 in the form of substantially triangle prisms, of which top angles are directed toward a viewer. On the other hand, on a surface 1c of a side opposite from the light radiation surface 1b in the light guide pipe 1, there is provided a light extracting mechanism 6 on which there are formed multiple dots 6a, 6b, 6c . . . printed in a predetermined pattern using light scattering ink.

In the light guide pipe 1 to which the above light extracting mechanism 6 is formed, on the surface 1c side that is opposite from the light radiation surface 1b there is provided a reflection sheet 7 in close proximity to this surface 1c. Further, as a different example of this type of conventional planar light source device, as shown in FIG. 45, the light modulating sheet 5 has the array 4 of substantially triangle prisms formed thereon, which is disposed above the light radiation surface 1b with the top angles of the triangle prisms facing toward the light radiation surface 1b of the light guide pipe 1.

Further, a light extracting mechanism 8, which is provided to the surface 1c being on the opposite side of the light guide pipe 1 from the light radiation surface, is composed of multiple protruding portions 8a, 8b, 8c . . . each having its surface formed as a rough surface. The planar light source devices according to the above side light method are capable of taking greater advantage of lightness and thinness, which are general characteristics of liquid crystal display devices, so they are frequently used as the backlight in liquid crystal displays of portable personal computers and the like.

However, in the conventional transmission-type liquid crystal display devices, there was the problem that the construction was still rather complicated. The reason for this was that, particularly in the planar light source device, it was not possible to obtain an illumination optical system having a simple structure and being capable of achieving the desired optical characteristics, so the structure of the planar light source device had to be made complex. The resultant increased costs and the like have prevented this type of liquid crystal display device from being widely used.

That is, in the planar light source devices shown in FIG. 44 and FIG. 45 which were used as the backlight optical system in, say, the transmission-type liquid crystal display device, in order to make use of the illumination light from the planar light source device as effectively as possible, a prism sheet or other such optical sheet item was frequently used. Accordingly, the structure of the illumination optical system become complicated, and as a result, high costs were incurred due to difficult assembly as well as low yield.

The present invention was developed to solve the conventional problems; therefore, an object of the present invention is to provide an inexpensive planar light source device which is based on a novel, simply constructed illumination system that is superior in its efficiency of utilization of illumination light beams, uses a light reflection sheet that is a novel light guide pipe and novel light control member to thereby achieve effective utilization of light, and also has a structure that is simple and superior in easiness of assembly.

DISCLOSURE OF THE INVENTION

The present invention relates to a planar light source device, which is comprised as follows in order to solve the above-mentioned technical problem. That is, the planar light source device according to the present invention is comprising a light guide pipe formed as a plate (sheet) made of transparent synthetic resin with one surface thereof serving as a light radiation surface, and a light source arranged in the vicinity of at least one side edge portion of the light guide pipe; and light beams radiating out from the light radiation surface of the light guide pipe at the time when the light source is lit up has a peak of a distribution of radiation angles with respect to a right angle direction to the surface of the side edge portion of the light guide pipe to which the light source is arranged being within ±15° from a normal line (perpendicular line) of the light radiation surface, and a half-width of the distribution of radiation angles being within ±30°.

Further, a planar light source device according to the present invention is comprising a light reflection sheet arranged to an opposite surface side from the light radiation surface of the light guide pipe; light beams that have entered the light guide pipe from the light source are radiated out from the opposite surface from the light radiation surface, and are reflected at the light reflection sheet; the reflected light is again made to enter the light guide pipe and is radiated out from the light radiation surface of the light guide pipe; and the radiated light at that time has a peak of the distribution of radiation angles with respect to the right angle direction to the surface of the side edge portion of the light guide pipe being within ±15° from a normal line (perpendicular line) of the light radiation surface, and a half-width of the distribution of radiation angles being within ±30°.

Further, a planar light source device according to the present invention is comprising a light extracting mechanism provided to the opposite surface from the light radiation surface of the light guide pipe, and a light extracting mechanism makes a greater part of the light beams that have entered the light guide pipe from the light source radiate out from the opposite surface from the light radiation surface, and reflect at the light reflection sheet.

Furthermore, a planar light source device according to the present invention is comprising a light guide pipe with one surface thereof serving as a light radiation surface; a light extracting mechanism provided to the light guide pipe; a light source provided to a side edge portion of the light guide pipe; and a light reflection sheet arranged to an opposite surface side from the light radiation surface of the light guide pipe; the light extracting mechanism serves as a mechanism for radiating out, toward the light reflection sheet side, at least 65% or more of light beams radiated out from the light guide pipe; and the light reflection sheet is formed with an arrangement of multiple substantially identical and/or substantially similar base units composed of sloped reflection surfaces at a pitch of 5000 μm or less.

In a planar light source device according to the present invention, which is provided with the above characteristics, it is preferable that, at least on one surface of the light guide pipe, there be provided corrugated unevenness having a pitch of 500 μm or less, and, in this case, ridge lines of the corrugated unevenness be set in a direction that is substantially perpendicular to the light guide pipe side edge portion where the light source is arranged.

Also, in a planar light source device according to the present invention, it is preferable that the light extracting mechanism be formed by a pattern in which there are arranged multiple convex protrusions provided to the opposite surface side from the light radiation surface of the light guide pipe. Here, it is preferable that a value h/Wmin defined by a depth h of the convex protrusions and a minimum opening width Wmin, be 0.5 or greater.

Further, in a planar light source device according to the present invention, it is preferable that a coat layer made of a transparent insulating material be provided on the light reflection surface. In this case, it is preferable the metallic material be silver or aluminum, and the coat layer be composed of a transparent material having a resistivity of $1.0 \times 16^6$ Ω·cm or greater.

Furthermore, in a planar light source device according to the present invention it is preferable that a surface of the coat layer composed of a light-transmissive material which is provided on the light reflection surface be a flat and smooth surface. It is also preferable that a printed pattern be provided on the flat and smooth surface of the coat layer.

BRIEF DESCRIPTION OF THE DRAWINGS

FIG. 3 is a plan diagram showing an outline of an arrangement example in a case where a point light source is used in the planar light source device of the present invention.

FIG. 4 is a partial plan diagram and cross-sectional diagram taken along a line 4b—4b, showing a light reflection sheet used in the planar light source device of the present invention, on a surface of which there are formed multiple base units composed of flat, sloped reflection surfaces formed in parallel straight lines and arranged such that ridge lines thereof are lined up in parallel.

FIG. 5 is a partial plan diagram and cross-sectional diagram taken along a line 5b—5b, showing another configuration of the light reflection sheet used in the planar light source device of the present invention, on the surface of which there are formed multiple base units composed of flat, sloped reflection surfaces formed in parallel straight lines and arranged such that ridge lines thereof are lined up in parallel.

FIG. 6 is a partial plan diagram and cross-sectional diagram taken along a line 6b—6b, showing still another configuration of the light reflection sheet used in the planar light source device of the present invention, on the surface of which there are formed multiple base units composed of concave sloped reflection surfaces formed in parallel straight lines and arranged such that ridge lines thereof are lined up in parallel.

FIG. 7 is a partial plan diagram and cross-sectional diagram taken along a line 7b—7b, showing still another configuration of the light reflection sheet used in the planar light source device of the present invention, on the surface of which there are formed multiple base units composed of concave sloped reflection surfaces formed in parallel straight lines and arranged such that ridge lines thereof are lined up in parallel.

FIG. 8 is a partial plan diagram and cross-sectional diagram taken along a line 8b—8b, showing still another configuration of the light reflection sheet used in the planar light source device of the present invention, on the surface of which there are formed multiple base units composed of concave sloped reflection surfaces.

FIG. 9 is a partial plan diagram and cross-sectional diagram taken along a line 9b—9b, showing yet still another configuration of the light reflection sheet used in the planar light source device of the present invention, on the surface of which there are formed multiple base units formed into concave mirror shapes.

FIG. 10 is a partial plan diagram and cross-sectional diagram taken along a line 10b—10b, showing yet still another configuration of the light reflection sheet used in the planar light source device of the present invention, on the surface of which there are formed multiple base units composed of concave sloped reflection surfaces.

FIG. 11 is a partial plan diagram and cross-sectional diagram taken along a line 11b—11b, showing yet still another configuration of the light reflection sheet used in the planar light source device of the present invention, on the surface of which there are formed multiple base units formed into concave mirror shapes.

FIG. 27 is a plan diagram showing, in outline, an example of an arrangement pattern of the convex protrusions which compose the light extracting mechanism provided to the light guide pipe.

FIG. 29 is a construction explanatory diagram schematically showing a state that light beams that have entered the light guide pipe become the surface light source, and a state that they do not become the surface light source depending on the light extracting mechanism, respectively.

FIG. 30 is a construction explanatory diagram showing, in outline, definitions of a depth h and a minimum opening width Wmin and maximum opening width Wmax, making reference to two examples of the convex protrusions that compose the light extracting mechanism provided to the light guide pipe.

FIG. 31 is a construction explanatory diagram showing, in outline, definitions of the depth h and the minimum opening width Wmin and maximum opening width Wmax, making reference to another two examples of the convex protrusions that compose the light extracting mechanism provided to the light guide pipe.

FIG. 32 is a construction explanatory diagram showing states that an ability to selectively radiate light beams to the reflection sheet side changes depending on the form of the convex protrusions that compose the light extracting mechanism provided to the light guide pipe.

FIG. 40 is a construction explanatory diagram showing a light beam locus in the planar light source device of the present invention, and a light beam locus in a conventional planar light source device, at a time when a light guide pipe provided with corrugated unevenness on the light radiation surface is used as a constitutive element of the planar light source device.

FIG. 41 is a perspective diagram partially showing the planar light source device in accordance with still another embodiment of the present invention, in which a light condensing function means of yet still another configuration is formed on the light radiation surface of the light guide pipe.

BEST MODE FOR CARRYING OUT THE INVENTION

Figure 1:
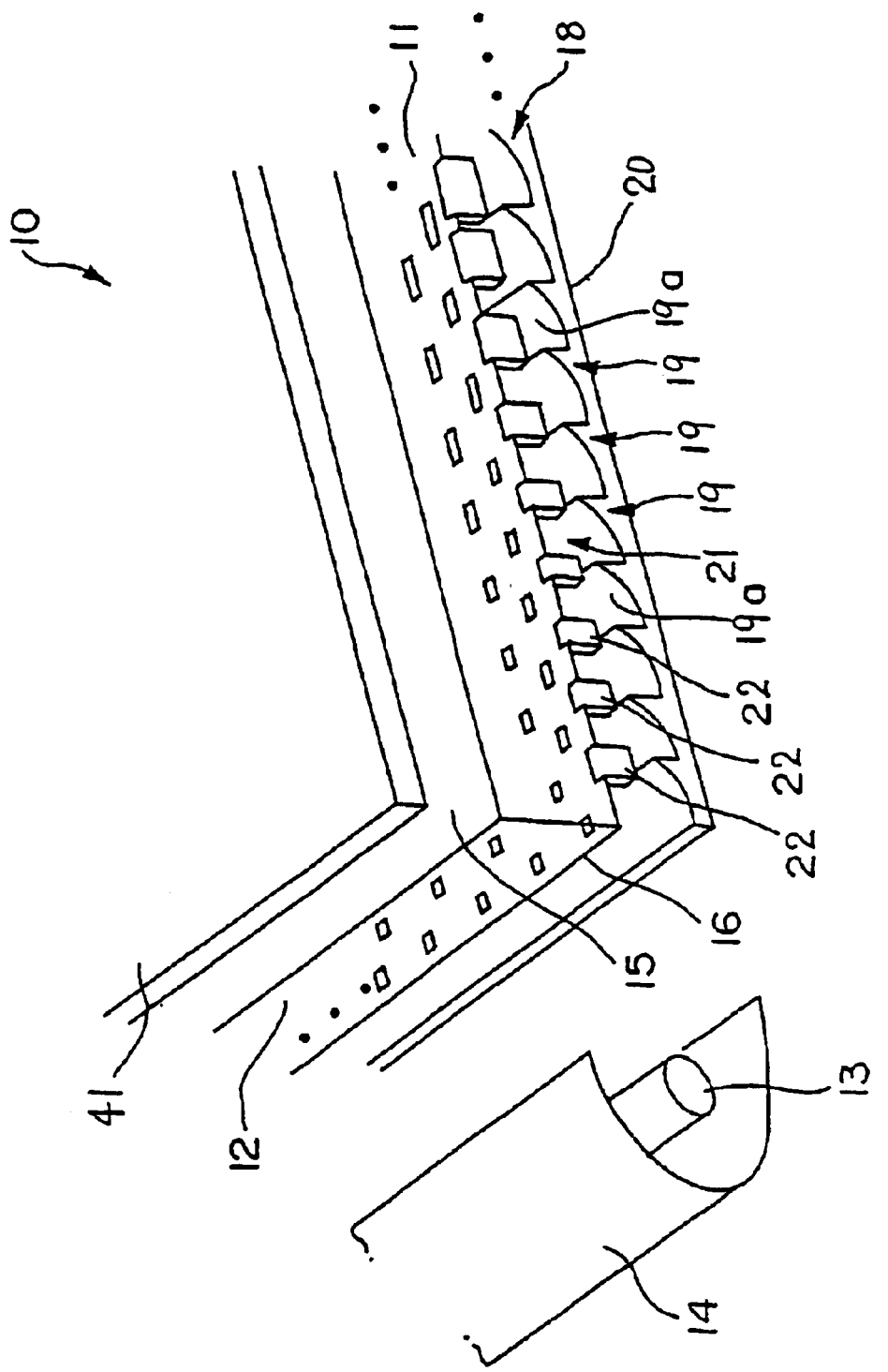
FIG. 1 is a perspective diagram showing a main portion of a planar light source device according to an embodiment of the present invention.
Figure 2:
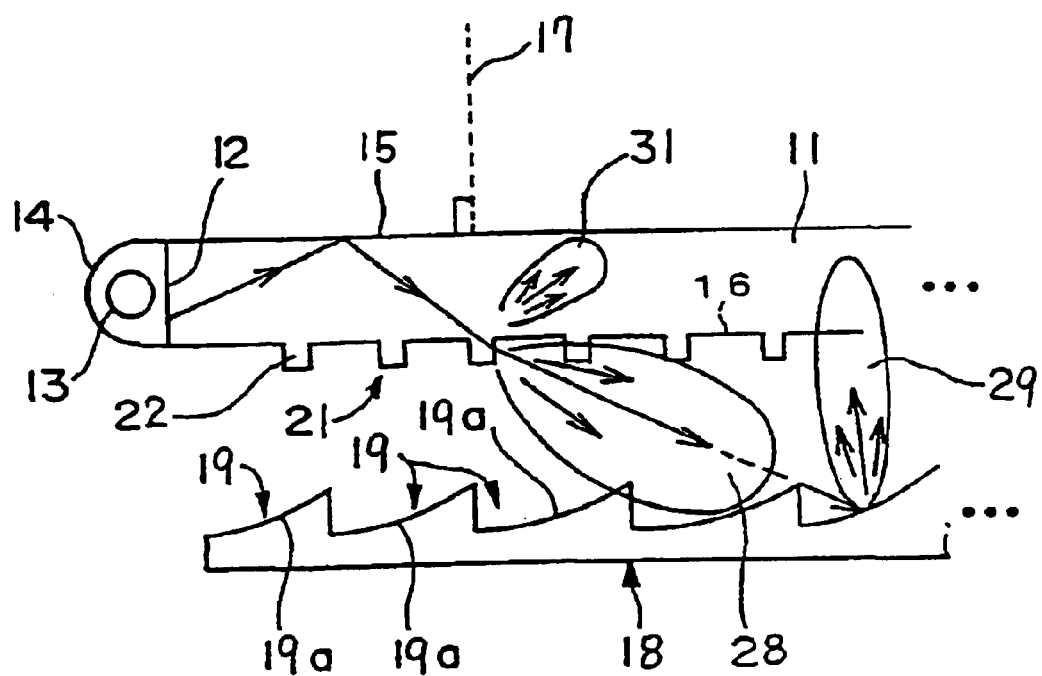
FIG. 2 is a construction explanatory diagram, schematically showing a state that light that has entered a light guide pipe becomes a surface light source in the planar light source device of the embodiment shown in FIG. 1.

Hereinafter, more detailed explanation will be made of a planar light source device of the present invention and liquid crystal display device using the planar light source device, with reference to embodiments shown in the diagrams. FIG. 1 and FIG. 2 are partial perspective and cross-sectional diagrams showing outlines of a main portion of a planar light source device 10 according to an embodiment of the present invention.

A planar light source device 10 according to this embodiment is provided with a substrate, namely a light guide pipe 11, composed of a translucent plate, and on a one side edge of the light guide pipe 11 there is a linear light source arranged so as to lie along the side edge surface 12. For the linear light source 13 it is possible to use a fluorescent tube, a LED array, or the like, but it is not particularly limited to these. For the linear light source 13, it is most preferable to use a cold cathode tube, which has excellent luminous efficiency and can easily be made compact.

(Arrangement of the Light Source)

Further, an arrangement of the linear light source 13 is not limited to this configuration, and additional representative configurations are: a one-light configuration having the cold cathode tube arranged only on the side edge portion; a two-light configuration of two cold cathode tubes arranged on the side edge portion; and a configuration in which one or two cold cathode tubes are arranged on the side edge portion and on an opposite side portion as well, thus having a total of two lights or four lights.

(Configuration of the Light Source)

Further, in the present invention, the configuration of the light source is by no means limited to the linear light source, and in a compact planar light source device, for example, it is possible to use an LED or other such point light source as shown in FIG. 3. That is, FIG. 3(a) shows an example in which an LED 39 which is a point light source is arranged to a corner-cut surface formed by cutting a corner portion of the light guide pipe 11 into a triangle shape as seen on a plane. Further, FIG. 3(b) shows an example in which an optical rod 40 is arranged adjacently to one side edge portion of the light guide pipe 11, and the point light source LED 39 is arranged to an end surface of the optical rod 40.

(Light Guide Pipe and Reflector)

On the side edge portion of the light guide pipe 11 there is a reflector 14 attached so as to cover the linear light source 13, thus serving as a mechanism in which direct light from of the linear light source 13 and reflected light reflected by the reflector 14, enter the light guide pipe 11 from the side edge surface 12, which is a light incidence surface.

The light guide pipe 11 is, for example, a translucent thin sheet having a sheet thickness of approximately 4 mm and a square shape, and a one surface thereof which is the upper surface as seen in FIG. 1 and FIG. 2 is a light radiation surface 15 which radiates light, and another surface on an opposite side from this (i.e., a bottom surface as seen in FIG. 1 and FIG. 2) is a surface 16 facing opposite to the light radiation surface. In FIG. 1, reference numeral 17 denotes a line perpendicular to the light radiation surface 15 of the light guide pipe 11, which is to say a normal line of the light guide pipe 11.

(Structure and Arrangement of a Light Reflection Sheet)

A light reflection sheet 18 is arranged adjacent to the surface 16 on the opposite side from the light radiation surface 15 of the light guide pipe 11. The light reflection sheet 18 is constructed with many base units 19 which are provided with sloping reflection surfaces 19a and are formed to a surface of a backing 20 at a minute pitch P. Here, the base units 19 indicate a basic shaping unit of the light reflection sheet 18 that is obtained as an aggregate of the sloped reflection surfaces 19a, which are substantially identical and/or substantially similar in shapes, as shown in FIG. 4 to FIG. 11.

That is, the base unit 19 is the smallest shaping unit, being, ultimately, a unit cell, which loses the quality of identicalness or similarity if it is divided further. Further, the pitch P is determined as the smallest length in a basic cycle produced by the arrangement of the base units 19 as shown in FIG. 4 to FIG. 11.

(Light Extracting Mechanism Provided to the Light Guide Pipe)

Additionally, there is provided a light extracting mechanism 21 to the light guide pipe 11. The light extracting mechanism 21 is composed so as to selectively make the light beams which have entered the light guide pipe 11 be radiated to the light reflection sheet 18; and, specifically, it is necessary that a light flux of equal to or greater than 65%, more preferably 70%, even more preferably 75% of the radiated light beams from the light reflection sheet 18 of the light guide pipe 11 be radiated thereto, and there is no particular limitation on the light extracting mechanism 21 to be used as far as it satisfies this requirement.

Figure 20:
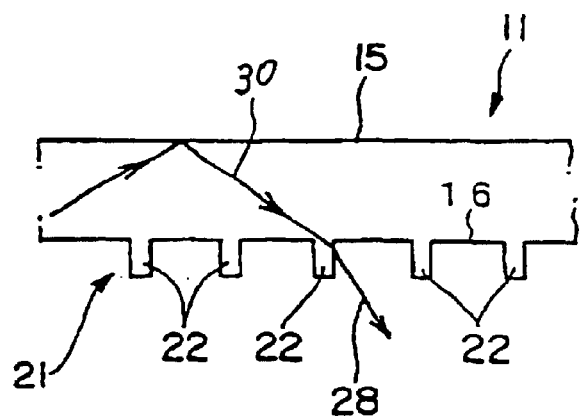
FIG. 20 is a cross-sectional diagram showing an outline of a configuration of a light extracting mechanism composed of multiple convex protrusions formed on an opposite surface from a light radiation surface of a light guide pipe in the planar light source device of the present invention, showing this by expanding a portion of the light guide pipe.

Here, in order to make at least 65% of all the radiated light beams that exit the light guide pipe 11 radiate to the light reflection sheet 18, one can conceive of various configurations for the light extracting mechanism 21 provided to that light guide pipe 11, but the configurations thereof are not particularly limited. However, as a most preferable configuration, there may be given a light extracting mechanism 21 in which a plurality of convex protrusions 22 are formed in a predetermined pattern to the surface (i.e., the surface on the light reflection sheet 18 side) 16 opposite from the light radiation surface 15 in the light guide pipe 11 as is shown in FIG. 20.

(Various Shapes of the Convex Protrusions of the Light Extracting Mechanism)

Additionally, for the convex protrusions 22 which are to perform the function of radiating the majority of light beam components 28 to the side of light reflection sheet 18, various shapes can be given which are shown in FIG. 30 and FIG. 31. The convex protrusion 22 shown in FIG. 30(a) is oval-shaped at a cross-section, and the convex protrusion 22 shown in FIG. 30(b) is rectangular at a cross-section. Further, the convex protrusion 22 shown in FIG. 31(a) is rectangular at a cross-section and the bottom end thereof is tapered to a triangle. Additionally, the convex protrusion 22 shown in FIG. 31(b) is a rectangular shape that is substantially a diamond shape at a cross-section.

(Various Configurations of the Light Extracting Mechanism)

Figure 21:
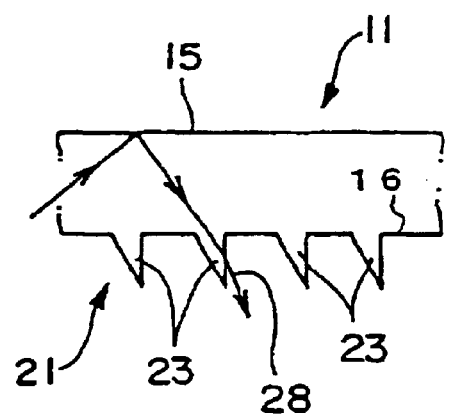
FIG. 21 is a cross-sectional diagram showing an outline of another configuration of the light extracting mechanism composed of multiple, cross-sectionally triangular protrusions formed on the opposite surface from the light radiation surface of the light guide pipe in the planar light source device of the present invention, showing this by expanding a portion of the light guide pipe.

In addition to these, as shown in FIG. 21–FIG. 25, using various surface shape designs, it is possible to execute a design such that the majority of the radiated light beams that radiate from the light guide pipe 11 is directed toward the light reflection sheet 18. Namely, the configuration shown in FIG. 21 is one in which multiple convex protrusions 22 shaped as triangles at a cross-section and are formed in a predetermined pattern to the surface 16 on the light reflection sheet 18 side of the light guide pipe 11, to thus serve as the light extracting mechanism 21.

Figure 22:
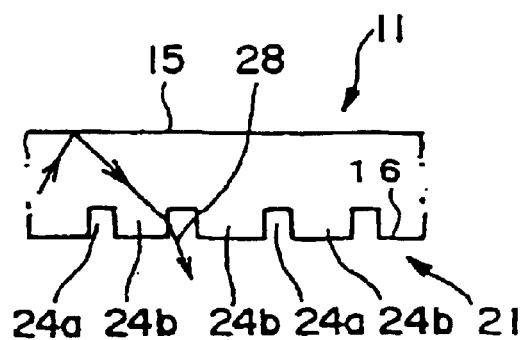
FIG. 22 is a cross-sectional diagram showing an outline of still another configuration of the light extracting mechanism composed of multiple concave depressions formed on the opposite surface from the light radiation surface of the light guide pipe in the planar light source device of the present invention, showing this by expanding a portion of the light guide pipe.
Figure 23:
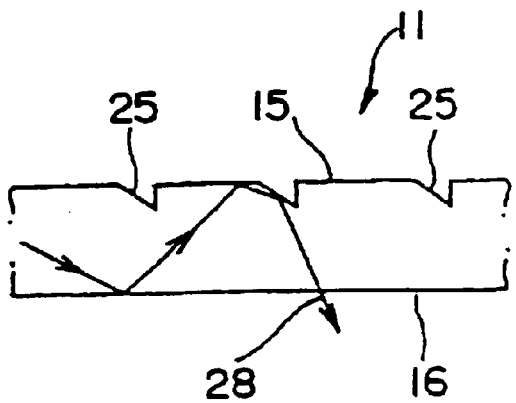
FIG. 23 is a cross-sectional diagram showing an outline of still another configuration of the light extracting mechanism composed of multiple cross-sectionally V-shaped groove portions formed on the light radiation surface of the light guide pipe in the planar light source device of the present invention, showing this by expanding a portion of the light guide pipe.

Further, the configuration shown in FIG. 22 is one in which concave depressions 24a are formed to the surface 16 of the light guide pipe 11 on the light reflection sheet 18 side, whereby relatively extruding portions 24b are formed, and this serves as the light extracting mechanism 21. Additionally, the configuration shown in FIG. 23 is one in which multiple groove portions 25 that are V-shaped at a cross-section are formed at predetermined intervals to the light radiation surface 15 of the light guide pipe 11, to thus serve as the light extracting mechanism 21.

Figure 24:
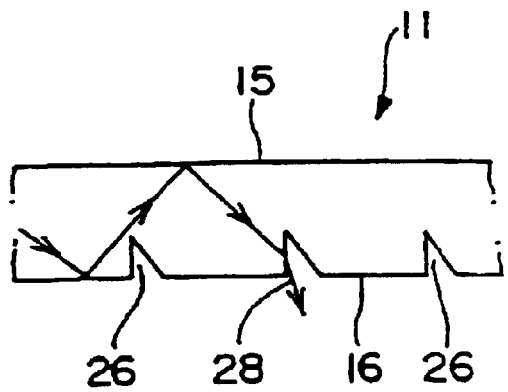
FIG. 24 is a cross-sectional diagram showing an outline of still another configuration of the light extracting mechanism composed of multiple cross-sectionally V-shaped groove portions formed on the opposite surface from the light radiation surface of the light guide pipe in the planar light source device of the present invention, showing this by expanding a portion of the light guide pipe.
Figure 25:
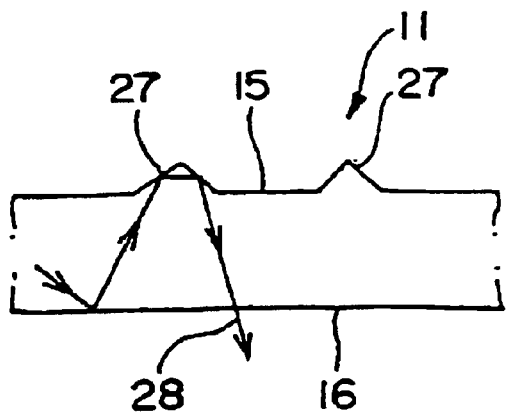
FIG. 25 is a cross-sectional diagram showing an outline of yet still another configuration of the light extracting mechanism composed of multiple, cross-sectionally pointed protrusions formed on the light radiation surface of the light guide pipe in the planar light source device of the present invention, showing this by expanding a portion of the light guide pipe.

Also, further, the configuration shown in FIG. 24 is one in which multiple groove portions 26 that are V-shaped at a cross-section are formed to the surface 16 on the light reflection sheet 18 side of the light guide pipe 11, and this serves as the light extracting mechanism 21. Further, the configuration shown in FIG. 25 is one in which multiple protrusions 27 having a cross-sectional shape of an inverted V and are formed at predetermined intervals to the light radiation surface 15 of the light guide pipe 11, and this serves as the light extracting mechanism 21.

In addition to these configurations, there can be a configuration in which a light scattering body that has forward scattering property with respect to a particular direction is provided inside the light guide pipe 11, or a configuration in which a hologram element or a surface relief element or other such diffractive optical element is provided to the surface of the light guide pipe 11, for example. As long as the light extracting mechanism 21 can radiate at least 65% of the radiated light beams from the light guide pipe 11 to the light reflection sheet 18 as described above, there is no particular limitation thereto.

(Selectivity Measuring Means for the Direction of Radiation)

Here, as described above, in the light guide pipe 11 used in the present invention, the proportion of the light flux that is selectively radiated to the light reflection sheet 18 must be at least 65% or greater of the total light flux emitting from the light guide pipe 11. This is for the effect of the optical design of the present invention to function effectively, as described above. An outline of a measuring means for measuring the selectivity on the direction in which the light flux radiates is discussed.

Figure 26:
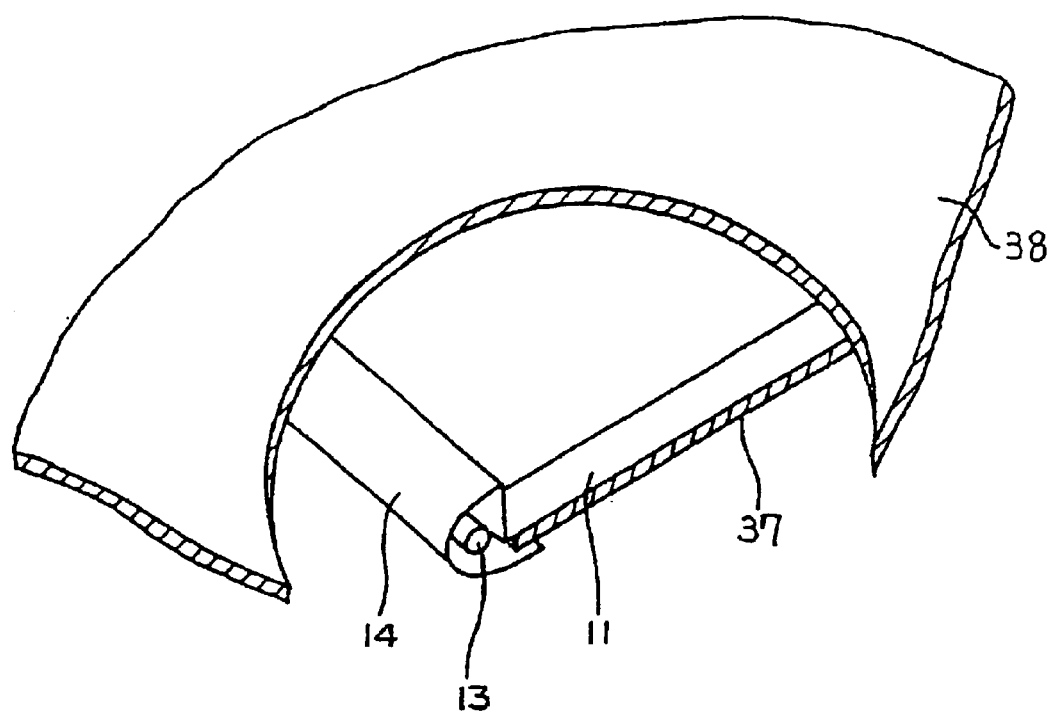
FIG. 26 is an explanatory diagram of a method of measuring directional selectivity of a light flux in the light guide pipe of the present invention.

Namely, a black sheet 37 (flock paper, for example) which nearly completely absorbs the light is first arranged at a position where the light reflection sheet 18 is normally arranged; and as shown in FIG. 26, the light guide pipe 11 is set facing in the normal direction and made to light up in a integrating sphere 37; and the total amount of the light flux radiated from the light radiation surface of the light guide pipe 11 obtained at this time is defined as $\Sigma a$.

Next, the light guide pipe 11 is set to face in the opposite direction from the normal direction (the surface that would normally face toward the side of the light reflection sheet is set to go toward the side of the light radiation surface), and is made to light up in an integrating sphere 38. The entire measured amount of light emitted from the side opposite from the light radiation surface of the light guide pipe 11 obtained at this time is defined as $\Sigma b$. At this time, a numerical value of $\Sigma b/(\Sigma a+\Sigma b)\times 100$ is the proportion (%) of the light flux that selectively radiates to the side of the light reflection sheet, and this value is set to be at least 65% or greater, more preferably 70% or greater, even more preferably 75% or greater.

(Pattern of Arrangement of Convex Protrusions, and Regulation Thereof)

Further, in the planar light source device, in order to maintain the illumination intensity on the surface at a given level, the exterior form of the pattern that is composed of the convex protrusions 22 which serves as the light extracting mechanism 21, is regulated such that light extraction efficiency increases as distance from the portion where the light source 13 is arranged increases. As examples of configurations for such regulation, there is given a configuration in which a surface area of openings in the convex protrusions 22 increases, and a configuration in which substantially identically shaped convex protrusions 22 are used and the density of the arrangement of the convex protrusions 22 increases as the distance from the light source 13 increases, for example.

From among these regulating configurations, a particularly easy one is the configuration in which the surface areas of the openings in the convex protrusions 22 increase. However, in the present invention, as described above, the light extracting mechanism 21, which is realized by the convex protrusions 22, must perform the function of selectively radiating the light beams that propagate through the inside of the light guide pipe 11 only to the light reflection sheet 18 side, so it is preferable that a value h/Wmin, which is defined according to a depth h and a minimal opening width Wmin, be kept high.

In light of this, when the surface areas of the openings in the convex protrusions 22 are simply increased, it can be predicted that the value of h/Wmin will deviate from the desired value at positions away from the light source 13. Therefore, the most preferable pattern formation is one in which the surface areas of the openings in the convex protrusions 22 increase while maintaining the value of h/Wmin at a given value. Specifically, the most preferable pattern formation is one as shown in FIG. 27, in which the openings in the convex protrusions 22 expand along a direction of a single axis as their arrangement positions move further away from the position at which the light source 13 is arranged.

Figure 28:
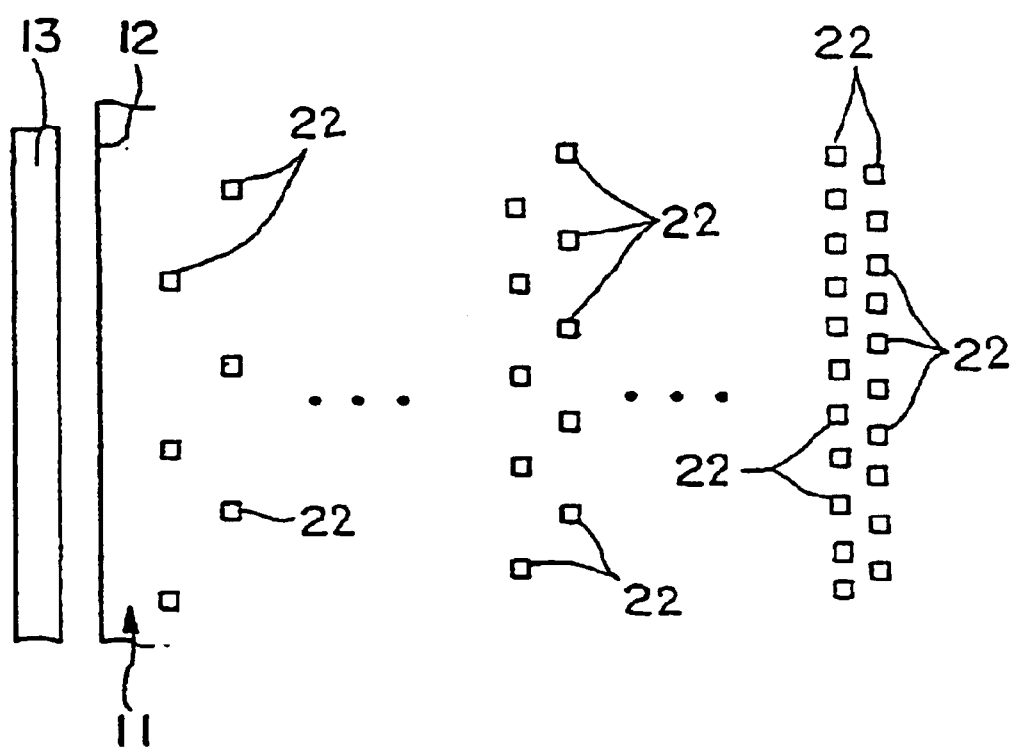
FIG. 28 is a plan diagram showing, in outline, a preferable arrangement pattern of the convex protrusions which compose the light extracting mechanism provided to the light guide pipe.

Further, for the regulating configuration, a configuration can also be used in which a pattern formation such as shown in FIG. 28 is used, in which substantially identically shaped convex protrusions having h/Wmin, h/Wmax and other such values which are within the desired range described above, and the arrangement density thereof increases as they are arranged further away from the position where the light source 13 is arranged. In particular, in this configuration, since substantially, identical convex protrusions 22 are used, it becomes possible to execute a formation having extremely powerful ability to selectively radiate the light beams to the light reflection sheet 18 side, so this configuration is most preferable for purposes of improving the efficiency of the planar light source device 10.

(Restrictions on the Configuration of the Light Extracting Mechanism)

In the planar light source device of the present invention, restrictions as to the form required for the light extracting mechanism 21, should ultimately be determined from the perspective of radiating 65% or greater of the light beams from the light reflection sheet 18 of the light guide pipe 11 as described above.

For example, to explain this in further detail with reference to FIG. 29(a) (b), in the case where the convex protrusions 23 shown in FIG. 21 having a triangle shape at a cross-section are formed to the surface 16 of the light guide pipe 11, it is preferable that the vertical angle β of a tip portion be 90° or less, more preferably 70° or less, even more preferably 50° or less.

That is, as the vertical angle β of a protrusion 23 formed to the surface 16 of the light guide pipe 11 is made larger as shown in FIG. 29(b), and the cross-sectional shape thereof becomes pointed in shape, there is a corresponding increase in unnecessary light beam components 31 that are radiated toward the light radiation surface 15 of the light guide pipe 11 due to the reflection achieved by the entirety of the protrusion 23. By using the triangular cross-sectional shape that has the small vertical angle, it becomes possible to increase the light beam components 28, 29 that will trace out a desired light beam locus (indicated by light beam component 29 which is, after being reflected by the light reflection sheet 18, radiated in the direction of the normal line 17 of the light guide pipe 11) of the present invention as shown in FIG. 29(a).

Further, to explain using another example, in the configuration using the convex protrusions 22 shown in FIG. 20, as shown in FIG. 30(a), it is preferable that these convex protrusions 22 have a value of h/Wmin as defined with h being the height of these convex protrusions 22, that is, the depth of the convex protrusions 22 as seen from inside the light guide pipe 11 and Wmin being the minimal opening width which is 0.5 or greater, more preferably 0.6 or greater, more preferably 0.7 or greater. Accordingly, the greater part of the light beams that are incident on the convex protrusions 22 will radiate to the light reflection sheet 18.

The convex protrusions 22 shown in FIG. 20 were oval-shaped at their cross-section, as is cleat in FIG. 30(a), but in the case where they are rectangular at their cross-section as shown in FIG. 30(b), the size of the shorter side of the cross-sectional rectangle is the minimal opening width Wmin. If the convex protrusions 22 are designed so as to satisfy such conditions, it is possible to configure a desirable shape with which at least 65% or greater of the radiated light beams from the light guide pipe 11 is radiated to the light reflection sheet 18.

Additionally, in order for the light beams that are incident on the convex protrusions 22 to be sufficiently radiated out to the light reflection sheet 18, it is preferable that the shape of the opening of the convex protrusions 22 be such that a value of h/Wmax, as defined with Wmax being a maximum opening width and h being the depth of the convex protrusions 22, is 0.5 or greater, more preferably 0.7 or greater, even more preferably 0.9 or greater, as shown in FIG. 30 and FIG. 31.

To explain this situation in further detail, as shown in FIG. 32(a), in the case where the minimum opening width Wmin is as desired, then it is easy for the light beams 30 that propagate through the inside of the light guide pipe 11 to collide against the walls of the convex protrusion 22. Thus, the light beams which have collided against the walls can no longer remain inside the light guide pipe 11, and are thus radiated out to the light reflection sheet 18 side (the radiated light beams are indicated by reference numeral 28).

However, in the case where the minimum opening width Wmin is in an inappropriate range as shown in FIG. 32(b), it is easy for the light beams 30 that propagate through the inside of the light guide pipe 11 to collide against the bottom portion of the convex protrusion 22, so the light beams collide against the walls after being entirely reflected by the bottom portion of the convex protrusion 22, as shown by the light beam locus in FIG. 32(b). As such, there are generated many light beam components 31 which are not radiated to the light reflection sheet 18 side. In other words, from the perspective of radiating the light beams out to the light reflection sheet 18 side, the most preferable configuration is that of the case shown in FIG. 32(c) in which the minimum opening width Wmin and the maximum opening width Wmax are both in the desired range.

As described above, in the light extracting mechanism preferably used in the present invention and depicted in FIG. 20 to FIG. 25, the form thereof is ultimately determined from the perspective of radiating out, to the light reflection sheet 18, 65% or greater of the light beams that radiate from the light guide pipe. Explanation will be made on more detailed designs.

(Light Extracting Mechanism Design Theory)

First, in a fluorescent tube or such which is frequently used as the light source, ultra-violet light which is obtained by means of plasma electric discharge excites minute fluorescent particles which are attached to a tube wall, and thus light emission is achieved. As such, distribution of the radiation angles of the radiated light beams obtained here indicates a characteristic similar to that of a so-called diffusional light source, in which uniform intensity is exhibited with respect to almost all angles.

Figure 33:
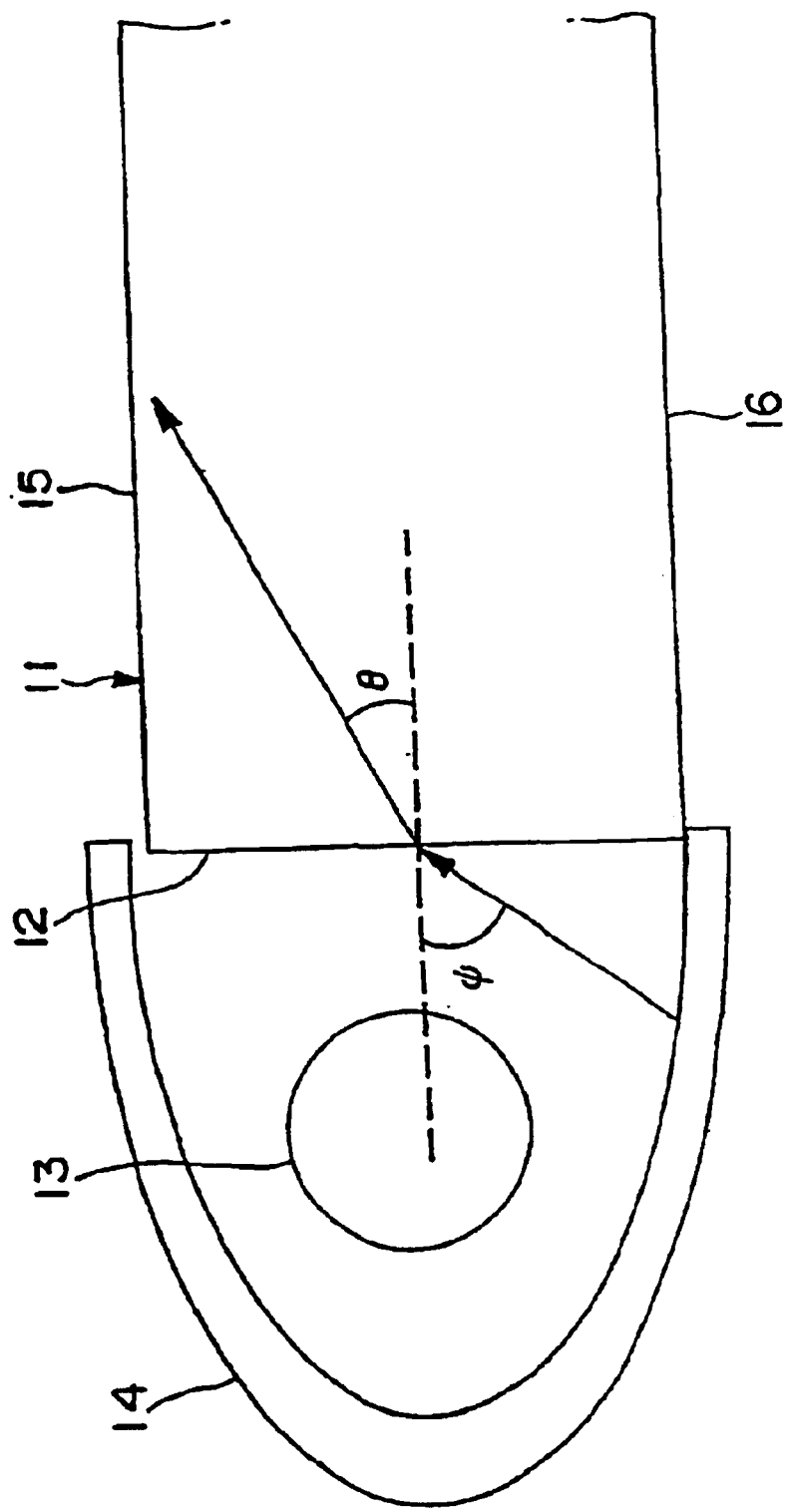
FIG. 33 is a partial cross-sectional diagram showing, in outline, the vicinity of a light incidence surface of the light guide pipe.

Therefore, in FIG. 33, which shows the vicinity around the light incidence surface of the light guide pipe, there is considered a geometrical distribution of the light beams that travel within the light guide pipe, based on assumption that the distribution of the angles of incidence of the light beams that are incident on the light guide pipe are constant from every angle.

Where the refractive index of the light guide pipe is defined as n according to Snell's Law, $$n \cdot \sin\theta = \sin\psi$$

$$\therefore \theta = \arcsin\left(\frac{\sin\varphi}{n}\right)$$

$$\left(0 \leq \theta \leq \theta \max = \arcsin\left(\frac{1}{n}\right)\right)$$

Figure 34:
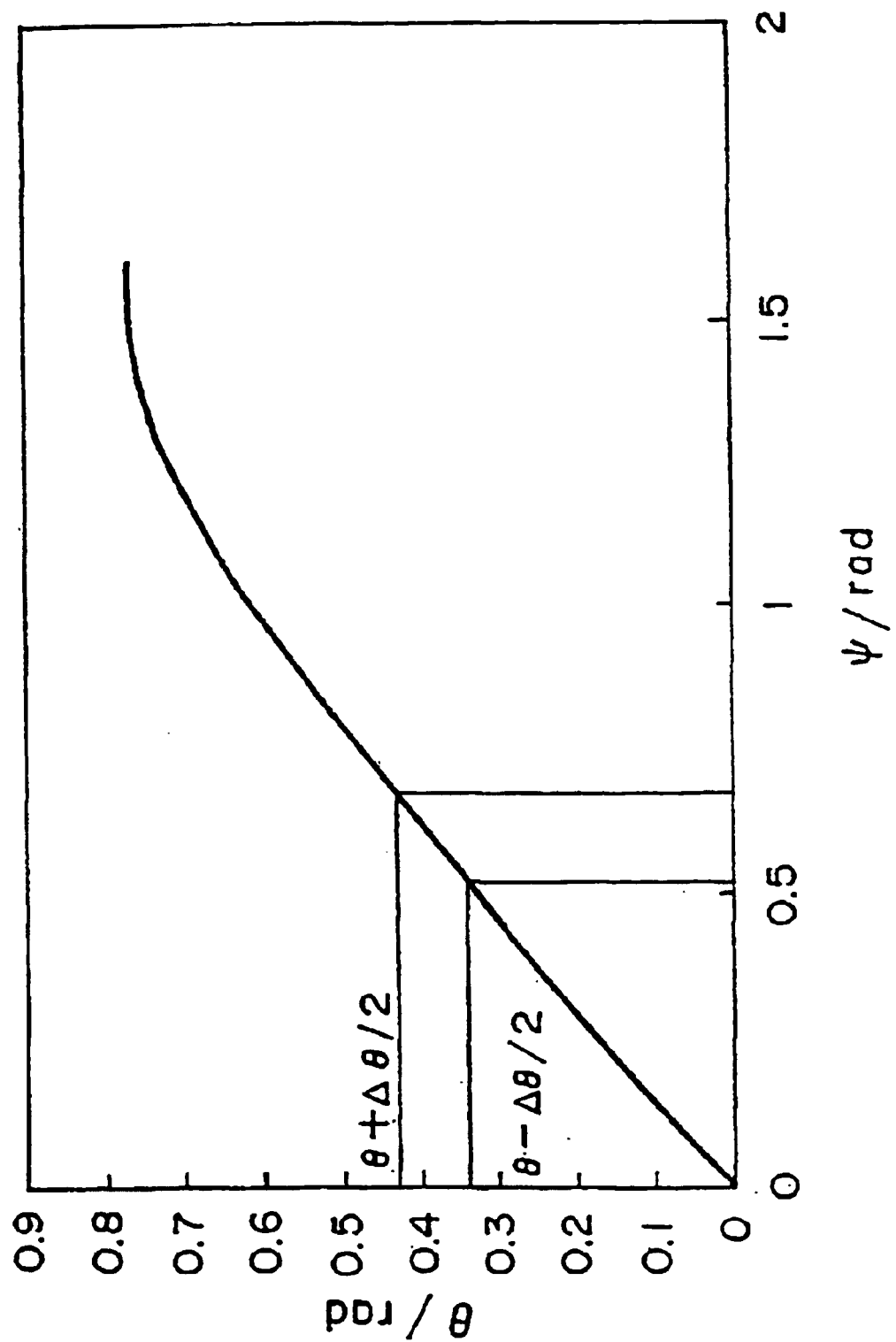
FIG. 34 is a characteristics diagram showing a relationship between an angle of incidence Φ into the light guide pipe and an angle of radiation θ to the inside of the light guide pipe after undergoing a refraction operation.

Therefore, a relationship between the incidence angle Φ at which the light beams that radiate from the light source become incident on the light guide pipe, and the angle θ that is formed by the light beams that have entered the light guide pipe (or, the radiation angle at which the light beams that entered, at the incidence angle of Φ, into the light guide pipe having the refractive index n are radiated into the inside of the light guide pipe), can be obtained as a graph shown in FIG. 34. When a density of a number of states n(θ) of the light beams at each θ is to be calculated, first, a quantity of light beams reaching, at a given θ, an area (region) having a width of ±Δθ/2 is obtained, based on approximation without consideration for Fresnel loss occurring at the boundary of the light guide pipe and using the number of states density n(θ) at the corresponding θ, as follows:

$$\text{arc sin}(n \cdot \sin(\theta + \Delta\theta/2)) \int n(\Phi) d\Phi \quad (1)$$

$$\text{arc sin}(n \cdot \sin(\theta - \Delta\theta/2))$$

wherein, $$\int_{\pi/2}^{\pi/2} n(\varphi) d\varphi = 1$$

Further, if the distribution of the angles of the incident light is treated as a constant, since $(\theta) = \text{Const}$ for an arbitrary $\theta$.

$$\int_{\pi/2}^{\pi/2} n(\Phi) d\Phi = \int_{\pi/2}^{\pi/2} \text{Const}. d\Phi = \text{Const}. \cdot \pi = 1$$

$$\int_{\pi/2}^{\pi/2} n(\varphi) d\varphi = \int_{\pi/2}^{\pi/2} \text{Const}. d\varphi = \text{Const}. \cdot \pi = 1$$

$$\therefore \text{Const}. = \frac{1}{\pi}$$

Therefore, $$\text{arc sin}(n \cdot \sin(\theta + \Delta\theta/2))$$

$$\int n(\varphi) d\varphi = \frac{1}{\pi} \left[ \arcsin\left(n \cdot \sin\left(\theta + \frac{\Delta\theta}{2}\right)\right) - \arcsin\left(n \cdot \sin\left(\theta - \frac{\Delta\theta}{\theta}\right)\right) \right]$$

$$\text{arc sin}(n \cdot \sin(\theta - \Delta\theta/2))$$

Therefore, the light beam distribution density $n(\theta)$ at $\theta$ is:

$$n(\theta) \approx \left[ \frac{\arcsin\left(n \cdot \sin\left(\theta + \frac{\Delta\theta}{2}\right)\right) - \arcsin\left(n \cdot \sin\left(\theta - \frac{\Delta\theta}{2}\right)\right)}{\frac{\Delta\theta}{2}} \cdot 2 \right]$$

$$\approx \frac{d}{d\theta}[\arcsin(n \cdot \sin\theta)]$$

$$= \left[ \frac{n \cdot \cos\theta}{\sqrt{1 - n^2 \sin^2\theta}} \right]$$

$$= n + \frac{n}{2}(n^2 - 1)\theta^2 + O[\theta]^4$$

In other words, in the vicinity of a critical angle of incidence, the density of the number of states increases significantly, and even when consideration is given for the effect of the Fresnel loss in formula (1), $$n(\theta) \approx \frac{n \cdot \cos\theta}{\sqrt{1 - n^2 \sin^2\theta}} \cdot f(\arcsin(n \cdot \sin\theta))$$

$$\approx n + \frac{n}{2}(n^2 - 1)\theta^2 + O[\theta]^4$$

$$f_s(\theta) = \frac{n \cdot \cos\theta \cdot \cos(\arcsin(n \cdot \sin\theta))}{(\cos(\arcsin(n \cdot \sin\theta)) + n \cdot \cos\theta)^2}$$

$$f_p(\theta) = \frac{n \cdot \cos\theta \cdot \cos(\arcsin(n \cdot \sin\theta))}{(n \cdot \cos(\arcsin(n \cdot \sin\theta)) + \cos\theta)^2}$$

Thus the tendency remains the same (note that, fs and fp represent a case of polarization s and polarization p respectively).

Therefore, in the case where transparent resin is used for the light guide pipe, as regards the angle of incidence on the side of the surface of the light guide pipe where the light extracting mechanism is formed, there exist many light beams which enter at an angle of incidence in the vicinity of 50°. That is, as shown in FIG. 29(*a*), if the shape of the convex protrusion is such that it has sufficient width relative to the width of the opening in the convex protrusion, then the light beams that become incident on the opening in the convex protrusion will be radiated from the wall of the protrusion without fail, so it becomes possible to selectively output the radiated light beams only in one direction, and the above-mentioned h/Wmin and h/Wmax will be set within the appropriate range by virtue of these factors. Also in other light extracting mechanisms shown in FIG. 22 to FIG. 25, the shape is designed in consideration of the characteristics of the light beams that propagate through the inside of the light guide pipe based on the above.

(Regarding Forming the Convex Protrusion of the Light Extracting Mechanism as a Flat and Smooth Surface)

Further, in the present invention, it is extremely important to execute a construction such that the greater part of the radiated light beams from the light guide pipe 11 are radiated out to the light reflection sheet 18 side. For example, even if a light guide pipe is obtained in which the above-mentioned value of h/Wmin is within the desired region, in the case where the side surface of the convex protrusions 22 or the surface around the opening in the convex protrusions 22 has become a rough surface due to (insufficient) mold precision or some other such cause, diffuse reflection of the light beams will take place at that rough surface portion and a situation will be generated in which it is no longer possible to radiate the greater part of the light beams out to the light reflection sheet 18.

That is, it is extremely important for the convex protrusions 22 to be constructed to have surfaces as flat and smooth as possible in order to approximately maintain the selectivity as to the direction of the radiated light flux from the light guide pipe 11. In a configuration in which the light extracting mechanism is a simple light-scattering phenomenon that is produced by the rough surface or by light-scattering particles as in the conventional-type planar light source device, it is not possible that the effect of the illuminating optical system of the present invention is sufficiently drawn out. More specifically, as regards the surface of the convex protrusions 22, a value Rz of average roughness across 10 points, as determined by JIS B0601, preferably has a range of 0.01 to 10 $\mu$m, more preferably 0.02 to 4 $\mu$m, even more preferably 0.02 to 2 $\mu$m, particularly preferably 0.05 to 1 $\mu$m. It is desirable that the phenomenon of unnecessary light scattering (light diffusion) caused by the rough surface portion be made so as not to occur.

(Working of the Light Reflection Sheet)

In the planar light source device of the present invention, the optical system is such that the greater part of the radiated light beams from the light guide pipe 11 is radiated to the light reflection sheet side as described above. There are many instances where these radiated light beams normally become light beams 28 with directivity which enter the light reflection sheet 18 at an angle as shown in FIG. 2.

Therefore, in the planar light source device of the present invention, due to an effect produced by the base units 19 that are composed of the substantially identical and/or substantially similar and sloped reflection surfaces 19*a* provided to the light reflection sheet 18 as shown in FIG. 2, the light beams 28 that have been selectively radiated from the light guide pipe 11 to the light reflection sheet 18 are deflected toward the forward direction of the light guide pipe 11. As a result, an extremely high illumination intensity can be obtained when the planar light source device 10 is viewed from the front.

Figure 44:
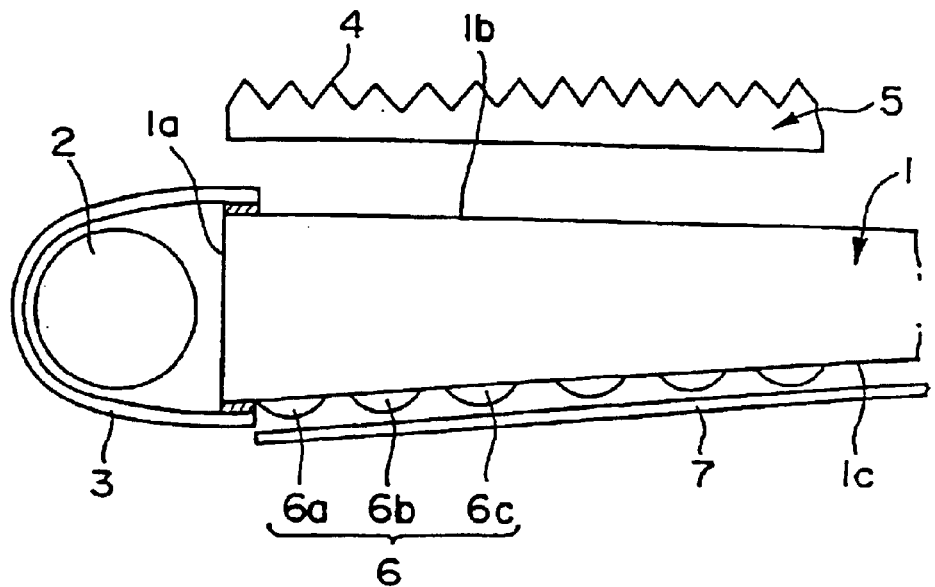
FIG. 44 is a cross-sectional diagram showing an outline of a main portion in an example of a conventional planar light source device.
Figure 45:
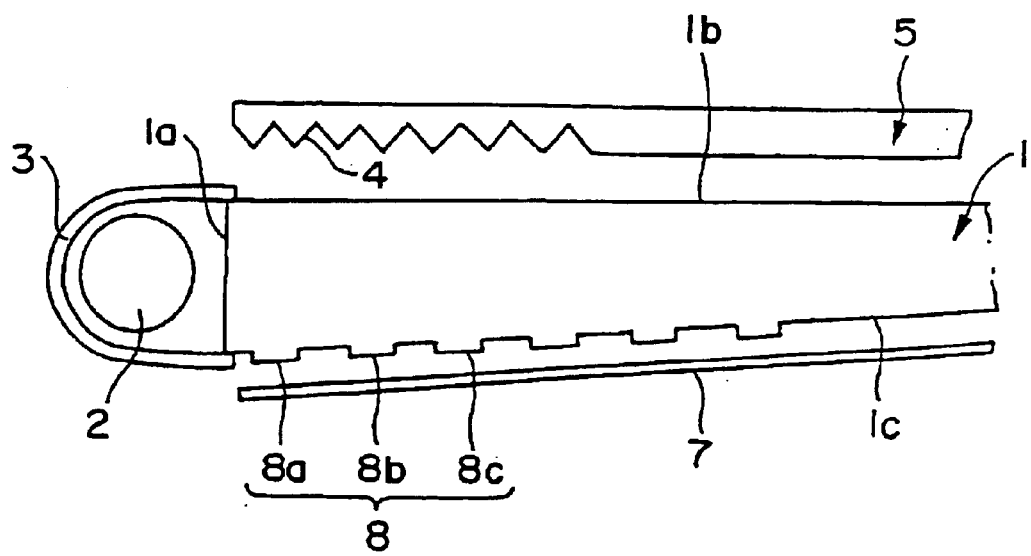
FIG. 45 is a cross-sectional diagram showing an outline of the main portion in another example of the conventional surface light source.

This can extremely simplify the construction of the illuminating optical system in comparison with the conventional-type planar light source device shown in FIG. 44 and FIG. 45. While a functions of condensing the light or the function of deflecting the light are attained by a refraction-type optical system such as a prism array in the conventional-type planar light source device, in the present invention, the substantially identical and/or substantially similar base units 19 composed of the sloped reflection surfaces 19a that are provided to the light reflection sheet 18 are designed in the form of, for example, concaved-surface mirrors, or the like, whereby the light reflection sheet 18 can be given the desired optical functions such as the light condensing function and the deflecting function. It becomes possible to provide the planar light source device having the significantly simplified structure while maintaining equal optical performance.

(Concrete Description of the Light Reflection Sheet)

Here, it is preferable that the light reflection sheet 18 used in the present invention be a backing 20 having flexibility with a thickness of 1000 μm or less, but shape of the thickness and the like can be appropriately selected in accordance with the object of application, so the thickness is not necessarily limited to the above. Further, as regards the reflectivity, from the perspective of achieving high efficiency it is desirable that the light reflection sheet 18 be composed of a material having a high reflectivity.

The material having the high reflectivity in the present invention indicates the material having the high reflectivity in a representative wavelength region within the visible light spectrum since the material is mostly used for purposes of displaying images to be viewed by people.

That is, the above value is defined by a ratio of the reflected light flux energy to the incident light flux energy in the visible light spectrum region as determined by JIS-Z8120. This ratio is normally 70% or greater, preferably 75% or greater, more preferably 85% or greater, particularly preferably 88% or greater, extremely preferably 91% or greater.

Further, in the present invention, alteration in color tone at the light reflection sheet portion should be avoided, and it is preferable that the light reflection sheet portion have flat reflection characteristics to the greatest extent possible in the range of the visible light spectrum. Therefore, it is possible to use the value of the spectral reflectance at 550 nm which is located substantially in the middle of the visible spectrum for the reflectivity, and a preferable range can be determined as well.

Furthermore, the above reflectivity refers to the reflectivity of the material positioned on the surface of the sloped surface that actually creates the reflection. Specifically, it is preferable that the surface portion of the sloped surface be provided with a material having a high reflectivity and exhibiting little color tone alteration, which is represented by silver or aluminum. Further, there are cases where a transparent coating layer or the like is provided on the reflection surface; however, the reflectivity mentioned here refers to the reflectivity of the surface of the material itself such as a metal material which contributes substantively to the reflection, without the coating layer.

Further, regarding the orientation of the reflection, mirror reflection and diffuse reflection are appropriately chosen in accordance with the optical characteristics of the illumination light that is needed; however, in general, in the case where high directivity is desired, it is a mirror reflection layer composed of silver, aluminum or the like is preferably used, and in the case where a wide distribution of radiation angles is desired, a diffuse reflection layer composed of a resin mulled with white pigment, a foam resin or the like is preferably used.

(Concrete Explanation of the Base Units Formed on the Light Reflection Sheet)

Further, in order to make the array of the base units 19 not recognizable on a screen, it is important that the pitch P of the array of the substantially identical and/or substantially similar base units 19 be as minute as possible. Specifically, the pitch P is 5000 μm or less, preferably 1000 μm or less, more preferably 500 μm or less.

For the substantially identical and/or substantially similar base units 19 which are composed of the sloped reflection surfaces 19a provided on the surface of the light reflection sheet 18, the configuration can be given in which: the structure is typically such that the base units 19 are sawtooth-shaped along their cross-section as shown in FIGS. 4(a) (b), or the base units 19 are point-shaped as shown in FIGS. 5(a) (b), and that the base units 19 have periodicity along the direction of only a single axis thereof; the pitch is 3000 μm or less, preferably 800 μm or less, more preferably 300 μm or less; and there is used the array of the base units 19 composed of the flat sloped reflection surfaces 19a formed in parallel straight lines and arranged such that the ridge lines 19b are lined up in parallel when the light reflection sheet 18 is viewed from above.

This is given because, in the configurations in which the ridge lines 19b of the sloped, flat reflection surfaces 19a are substantially arranged in parallel as shown in FIGS. 4(a) (b) and FIGS. 5(a) (b), it is easy to apply cut processing using a diamond cutting tool or end mill, and thus, production of the mold to provide this shape is easy, minute sizing is easy, and a capacity for mass production is significantly high.

Figure 16:
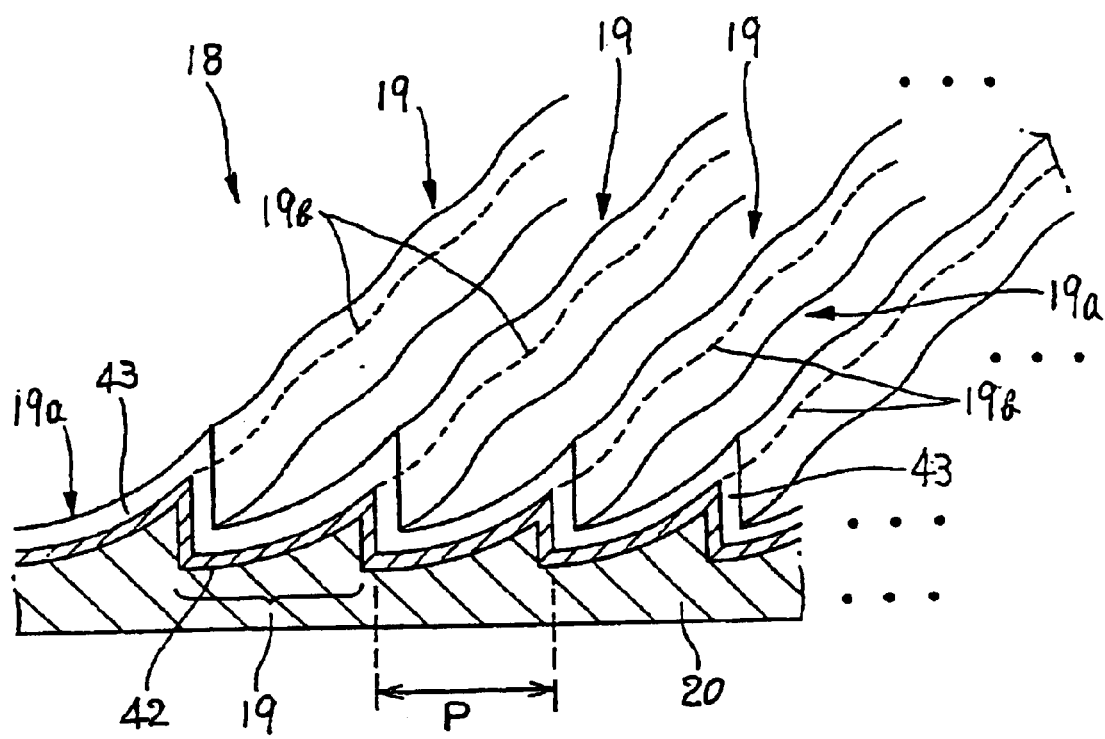
FIG. 16 is a partial perspective diagram of another example of the light reflection sheet used in the planar light source device of the present invention.

Further, what is meant by "the ridge lines 19b of the multiple base units 19 are arranged in a parallel state" is not that a completely parallel state is maintained, but that they are arranged in substantially parallel. That is, as shown in FIG. 16, a configuration, or the like is also possible in which mutually adjacent ridge lines are arranged while exhibiting minute looseness. In such a configuration, it becomes possible to prevent optical interference with a gate array of the liquid crystal panel, thereby obtaining illumination light characteristics that are desirable for the backlight device.

By using such a light reflection sheet 18 in which there are arranged the multiple flat sloped reflection surfaces 19a in parallel strait lines: the pattern composed of the above-mentioned convex protrusions 22 becomes the light extracting mechanism 21, and the radiated light beams from the light guide pipe 11 designed so that the greater part of the light flux radiated from the light guide pipe is directed toward the side on which the light reflection sheet 18 is arranged is reflected in the direction of the normal line 17 in relation to the light guide pipe 11 by the effect of the flat sloped reflection surfaces 19a in parallel straight lines. Therefore, it becomes possible to obtain an illuminating light beam having extremely favorable characteristics for the planar light source device 10.

Figure 12:
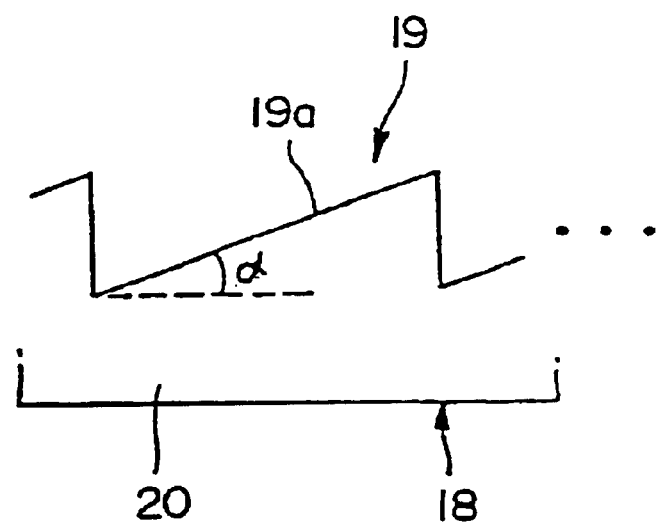
FIG. 12 is a cross-sectional diagram partially expanding the flat sloped reflection surfaces in the parallel straight lines of the base units formed on the light reflection sheet shown in FIG. 2 and indicating a slope angle of the sloped reflection surfaces.

As shown in FIG. 12, depending on the configuration of the used light extracting mechanism 21, there are various ranges that are desirable for a slope angle α of the sloped reflection surfaces 19a used for the substantially identical and/or substantially similar base units 19. The range should be appropriately determined from the viewpoint of changing the direction of the radiated light beams from the light guide pipe 11 to the direction of the normal line 17 of the light radiation surface 15.

For example, in the configuration that uses the convex protrusions 22 for the light extracting mechanism 21 as shown in FIG. 20, or in the configuration that uses the cross-sectionally triangular protrusions 23 as shown in FIG.

21, for the slope angle α of the sloped reflected surfaces 19a, it is favorable to use a range of preferably between 50° to 7°, more preferably between 40° to 10°, even more preferably between 34° to 15°.

Further, it is preferable that the cross-section of the sloped reflection surfaces 19a that compose each base unit 19 have the concaved shape shown in FIG. 6 and FIG. 7, from the viewpoint of light condensation. This is preferably used not only in the configuration in which there are arranged the multiple flat sloped reflection surfaces in parallel straight lines which are preferably used in the present invention, but also in a configuration in which there are arranged base units 19 shaped as concaved-surface mirrors as shown in FIG. 8 to FIG. 11, or the like.

Figure 13:
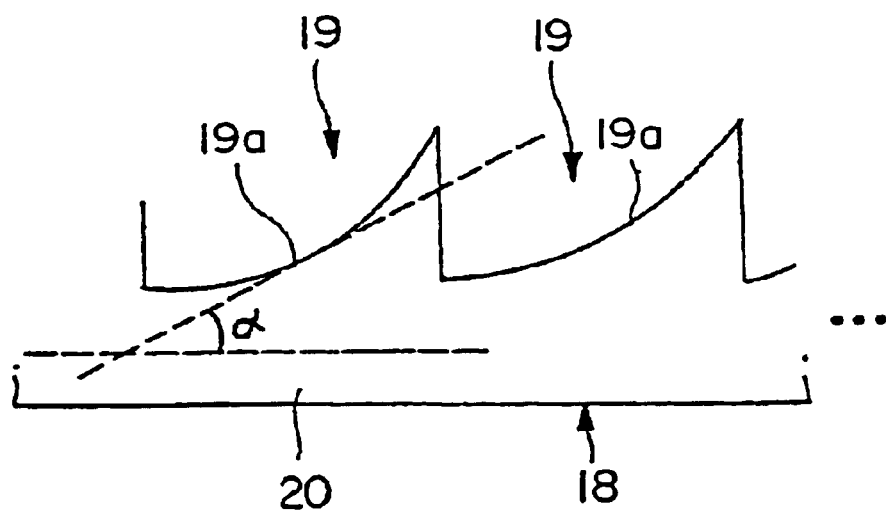
FIG. 13 is a cross-sectional diagram partially expanding the concave sloped reflection surfaces of the base units formed on the light reflection sheet shown in FIG. 6 and indicating the slope angle of the concave sloped reflection surfaces.

Even in this case, the range that is to be used preferably for the slope angle α of the sloped reflection surfaces 19a should be determined from the perspective of changing the direction of the radiated light beams from the light guide pipe 11 into the direction of the normal line 17 of the light radiation surface 15. For example, in the configuration that use the convex protrusions 22 or the cross-sectionally triangular protrusions 23 for the light extracting mechanism 21 as shown in FIG. 20 or FIG. 21, a preferable range for the slope angle α of tangent lines at a center portion of a concaved cross-section as shown in FIG. 13 is preferably between 50° to 7°, more preferably between 40° to 10°, even more preferably between 34° to 15°.

The base units 19 composed of the cross-sectionally concave reflection surfaces 19a are provided as reflective elements to the light reflection sheet 18, whereby it becomes possible to convert the light flux 28 having a broad expanse which radiates out from the light extracting mechanism 21 provided to the light guide pipe 11 into a light flux 29 having sharper angle characteristics (a light flux that is closer to a parallel light flux) while radiating the light flux in the direction of the normal line 17 with respect to the light guide pipe 11. In other words, due to the light-condensing effect of the concaved-surface mirrors, it becomes possible to convert the radiated light beams from the light guide pipe 11 into a more collimated radiated light beams which are extremely bright in the direction of the normal line 17 with respect to the light guide pipe 11.

Therefore, the light condensing effect that was realized in the conventional-type planar light source device by using a member which was difficult to produce and expensive, such as a prism array can be realized without even using such a member, and substantially equal optical characteristics can be maintained while a structure of the planar light source device can be significantly simplified. This entails extremely many advantages for a practical planar light source device, such as reduction in the number of assembly steps, improvement in yield, lowering of probability of dust mixing and cutting costs.

(Explanation of Bright Line Prevention Effect)

Figure 35:
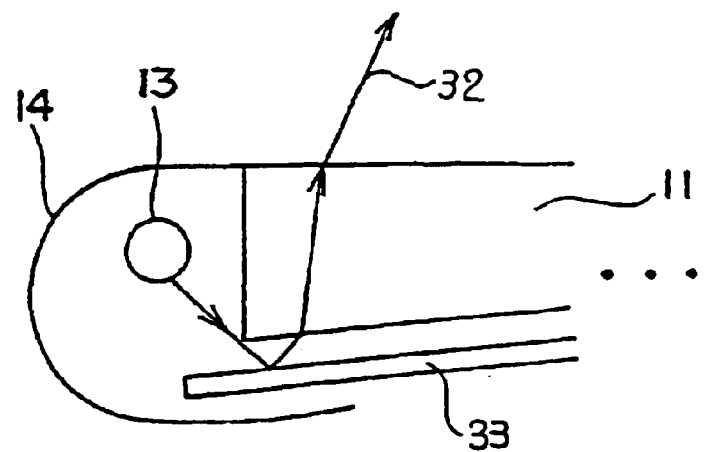
FIG. 35 is a construction explanatory diagram showing a state that a bright line is generated in the light guide pipe in the vicinity of the light source arrangement in the planar light source device.

Further, in the conventional-type planar light source device, on the side edge portion 12 of the light guide pipe 11 on which the light source 13 is arranged as shown in FIG. 35, there used to occur a phenomenon called a bright line 32 which worsened the outward appearance. However, the biggest cause of this phenomenon was the light beams that entered the upper and lower surfaces of the light guide pipe 11 via a reflection sheet 33 in the vicinity of the side edge portion 12 of the light guide pipe 11. In order to eliminate this bright line 32, such measures were taken as altering an arrangement of reflectors, applying a light-absorbing print onto the reflection sheet 33, etc. However, this involved further complication of the structure and incurred higher costs.

Figure 36:
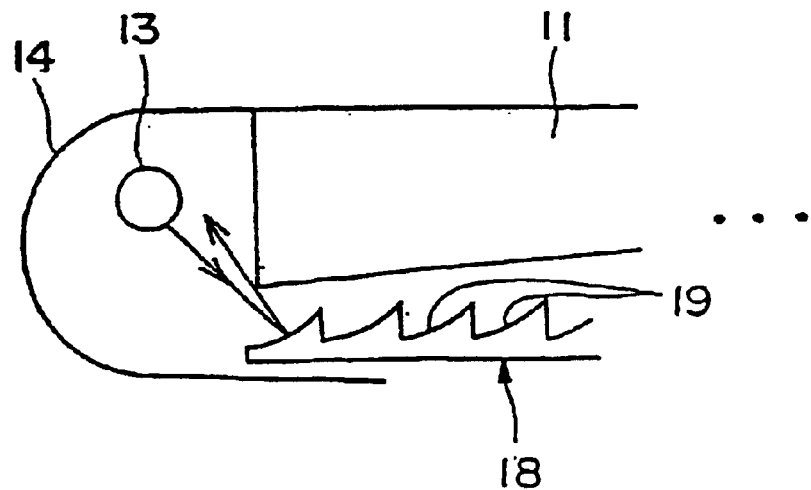
FIG. 36 is a construction explanatory diagram showing that the bright line is difficult to occur in the light guide pipe in the vicinity of the light source arrangement in case of the planar light source device of the present invention.

However, in the planar light source device of the present invention, as described above, the substantially identical and/or substantially similar base units 19 which are composed of the sloped reflection surfaces 19a are used for the light reflection sheet 18, so, as shown in FIG. 36, even the incident light beams to become bright line components in the conventional-type planar light source device are rebounded by the base units 19 that are composed of the sloped reflection surfaces 19a, and the light beams do not radiate out over the light guide pipe 11 as the bright line. Therefore, the quality of the outward appearance as a surface light source becomes significantly superior.

(Form of the Base Units Considered from the Perspective of Light Condensation)

Figure 15:
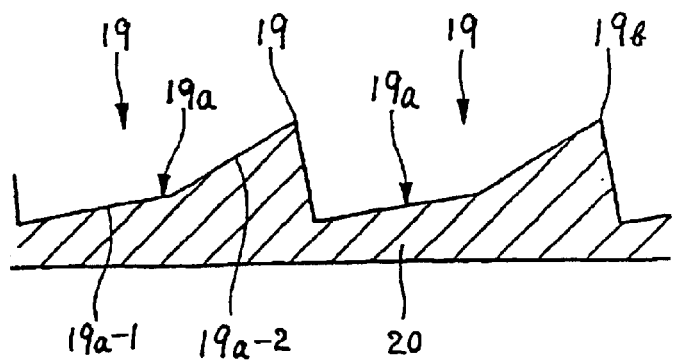
FIG. 15 is a partial cross-sectional diagram showing an easily produced form for the base units constituting the light reflection sheet of the present invention.

Incidentally, from the perspective of light condensation of the planar light source device of the present invention, a desirable configuration is one in which the cross-sectionally concave and sloped reflection surfaces 19a are used for the base units 19 as is described above. However, it is additionally desirable that these cross-sectionally concave and sloped reflection surfaces 19a are cross-sectionally polygon-shaped as shown in FIG. 15. This is because when the mold is made, generally a cutting process is used in which a diamond cutting tool or the like is utilized, and the production of the bite is easy because of the cross-sectional polygon shape. The reasoning is explained in more detail. In the case of the cross-sectionally polygon-shaped concave reflection surfaces 19a shown in FIG. 15, the concave reflection surfaces are formed by joining two flat sloped surfaces 19a-1 and 19a-2 separated by not curved lines but straight lines that are cross-sectional contour lines forming the concave reflection surfaces. Further, as another configuration of the substantially identical and/or substantially similar base units 19 that are composed of the sloped reflection surfaces 19a, there is given a configuration which uses a structure in which the concaved-surface mirror reflection surfaces 19a having a maximum diameter of 3000 μm or less, more preferably 800 μm or less, even more preferably 300 μm or less are arranged as shown in FIG. 9 or FIG. 11. In such a configuration, it is possible to perform the light condensation not only in one direction but in two perpendicular directions. Thus, it becomes possible to further improve the light condensation as compared to the above-mentioned configuration in which there were arranged the multiple sloped reflection surfaces 19a formed in parallel straight lines.

Here, also in the configuration that uses the structure in which there are arranged the above concaved-surface mirror reflection surfaces, it goes without saying that the form thereof is designed such that the light beam components radiated from the patterned portion composed of the convex protrusions and traveling toward the light reflection sheet side are reflected in the direction of the normal line with respect to the light guide pipe. Thus, the condensation of light in the two directions and the changing of the direction of the light flux to the forward direction of the light guide pipe are achieved simultaneously, thereby being capable of obtaining a significantly superior illumination light beam for the planar light source device.

Figure 17:
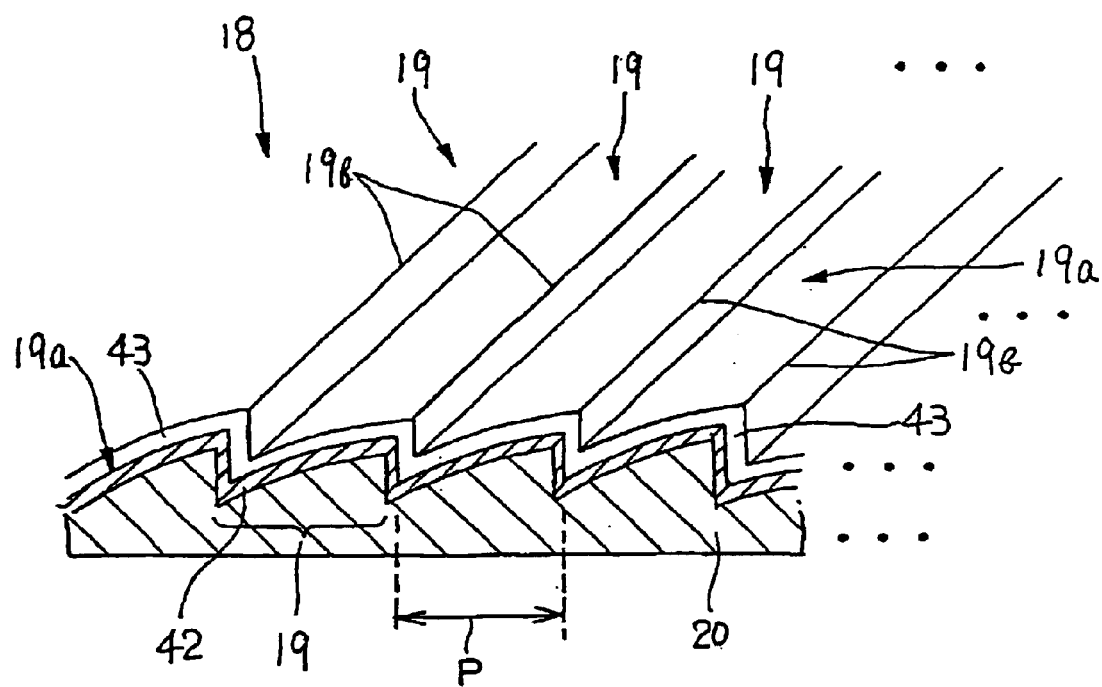
FIG. 17 is a partial perspective diagram showing the main portion in still another example of the light reflection sheet used in the planar light source device of the present invention.

Thus, in the light reflection sheet 18 of the above-mentioned embodiment, the base units 19 were provided with the cross-sectionally concave reflection surfaces 19a. However, the reflection surfaces 19a of the base units 19 are not restricted to have the cross-sectionally concave shape, and may be formed to have a cross-sectionally convex shape as shown in FIG. 17. Even when such convex-shape reflexive surfaces are used for the reflection surfaces 19a of the base units 19, it is possible to bring about useful illuminative optical action such as deflecting the light that has entered the light reflection sheet, expanding the distribution of the radiation angles.

Figure 37:
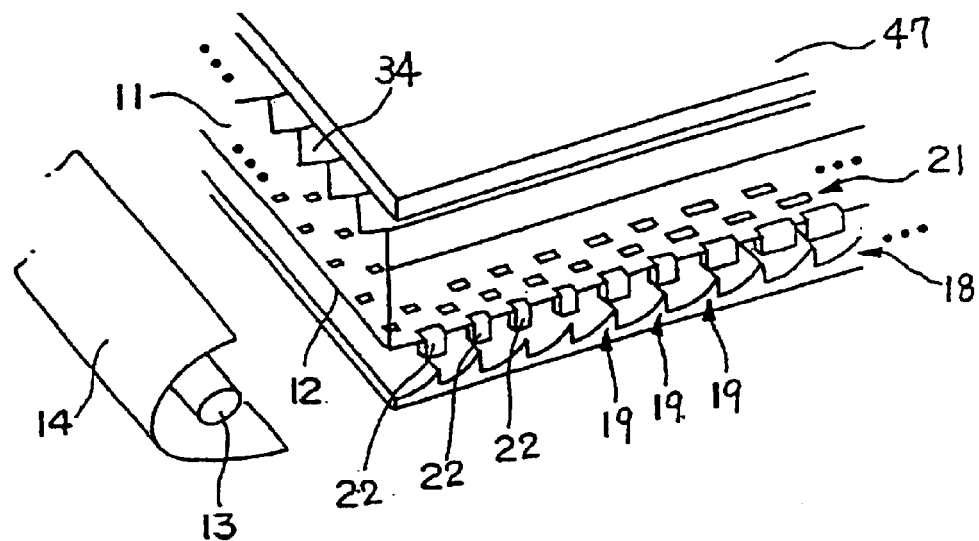
FIG. 37 is a perspective diagram partially showing the planar light source device in accordance with another embodiment of the present invention, in which a means possessing a light condensing function is provided on a top surface of the light guide pipe.
Figure 38:
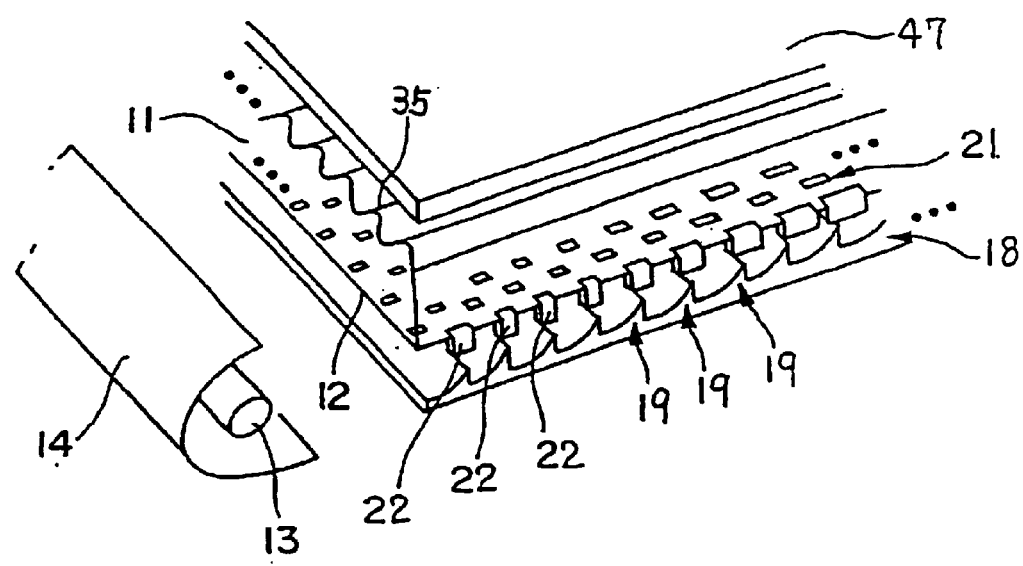
FIG. 38 is a perspective diagram partially showing the planar light source device in accordance with another embodiment of the present invention, in which another means possessing a light condensing function is provided on the top surface of the light guide pipe.
Figure 39:
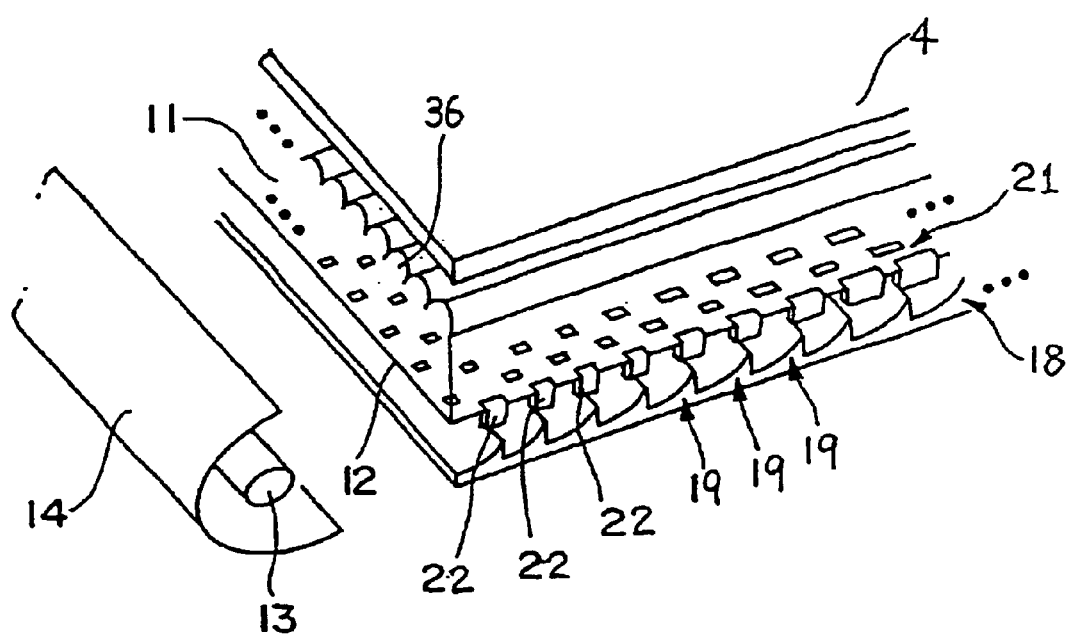
FIG. 39 is a perspective diagram partially showing the planar light source device in accordance with another embodiment of the present invention, in which still another means possessing a light condensing function is formed on the top surface of the light guide pipe.

Further, in order to improve the light condensation of the planar light source device in the present invention, on the upper surface 15 of the light guide pipe (the surface on which the pattern composed of the convex protrusions is not arranged), it is desirable to provide pointed unevenness 34 as shown in FIG. 37, or corrugated unevenness 35 as shown in FIG. 38, and, additionally, lenticular lens elements 36 as shown in FIG. 39.

At this time, the direction of the pointed or corrugated unevenness 34, 35 or the lenticular lens elements 36 is established such that ridge lines thereof are substantially perpendicular to the side edge portion 12 to which the light source 13 is provided. Accordingly, together with the light condensing effect obtained from the sloped reflection surfaces 19a provided to the light reflection sheet 18 and having the cross-sectionally concaved shape or the like, it thus becomes possible to obtain a significantly great light condensing effect.

To explain this situation in further detail, in the present invention, due to the effect of the light extracting mechanism 21 as shown in examples in FIG. 20 to FIG. 25, the greater part of the radiated light beams 28 from the light guide pipe is once made to be radiated toward the light reflection sheet 18 side as shown in FIG. 2. Then, due to the effect of the substantially identical and/or substantially similar base units 19 composed of the sloped reflection surfaces 19a provided to the light reflection sheet 18, the direction of the radiated light beams is deflected in the direction of the normal line 17 with respect to the light guide pipe 11. Then the light beams are incident onto the light guide pipe 11 again and are concentrated by means of the pointed or corrugated unevenness 34, 35 such as a triangular prism array or the lenticular lens elements 36, which are provided to the light guide pipe.

Accordingly, although there was a proposal to form the triangular prism array or the like integrally with the light guide pipe to improve the light condensation even in the conventional-type planar light source device, the situation as viewed from an optical perspective is in the planar light source device of the present invention entirely different from the conventional one, and it becomes possible to obtain an essentially advantageous optical system from the perspective of light condensation. This situation is shown in FIGS. 40(a)(b).

In other words, in the conventional-type planar light source device, there were many light beam components 31 which tried to travel directly in the direction of the light radiation surface 15 from the inside of the light guide pipe 11. Therefore, as shown in FIG. 40(b), the light beam did not travel toward the direction of the normal line 17 with respect to the light guide pipe 11. Even light beam components which were supposed to be concentrated passed through a boundary between the light guide pipe 11 and air layer only one time, as seen in the light beam locus shown in FIG. 40(b). Therefore, sufficient condensation could not be achieved.

However, in the planar light source device of the present invention, the greater part of the radiated light beams 28 from the light guide pipe 11 is once radiated toward the light reflection sheet 18 as shown in FIG. 40(a). Therefore, as seen in the light beam locus shown in FIG. 40(a), the greater part of the radiated light beams 28 can pass through the interface between the light guide pipe 11 and the air layer two times, so the light guide pipe 11 itself functions as a thick lens array sheet. Thus, it is possible to obtain significantly superior performance from the perspective of light condensation.

In order to more specifically consider this effect, a calculation is made of a distribution of the states of the light beams that radiate geometrically from the light radiation surface. In FIG. 40, which is a cross-sectional diagram viewed from the side of the light incidence surface 11 of the light guide pipe, the radiation angle at which the light beams are radiated by the light extracting mechanism provided to the light guide pipe is defined as $\gamma$, and a vertex angle of the triangular prism array provided to the light guide pipe is defined as $\delta$.

In the light guide pipe in which the triangular prism array of the conventional type was provided, there was no optical design for selectively leading the radiated light beams to the light reflection sheet 18 side by means of the light extracting mechanism. Therefore, as shown in 40(b), there were many light components 41 which entered the triangular prism portion directly from the inside of the light guide pipe and underwent the refraction process in the prism portion. The angle of radiation $\zeta_b$ of such light components 41 is expressed as a function of $\gamma$ and $\delta$ as follows:

$$\xi_b = \arcsin\left(n \cdot \sin\left(\gamma - \frac{\delta}{2}\right)\right) + \frac{\delta}{2}$$

On the other hand, in the optical system of the present invention shown in FIG. 40(a) in which the radiated light beams are once radiated out to the light reflection sheet 18 and the light guide pipe can operate as the prism sheet, the distribution of the radiation angles $\zeta_a$ of the radiated light beams is expressed as

[Formula 9]

$$\xi_a = \arcsin\left(n \cdot \sin\left(\frac{\pi}{2} - \arcsin\left(\frac{1}{n} \cdot \sin\left(\frac{\pi}{2} - \gamma\right)\right) - \frac{\delta}{2}\right)\right) + \frac{\delta}{2} \quad \text{[Formula 9]}$$

Figure 42:
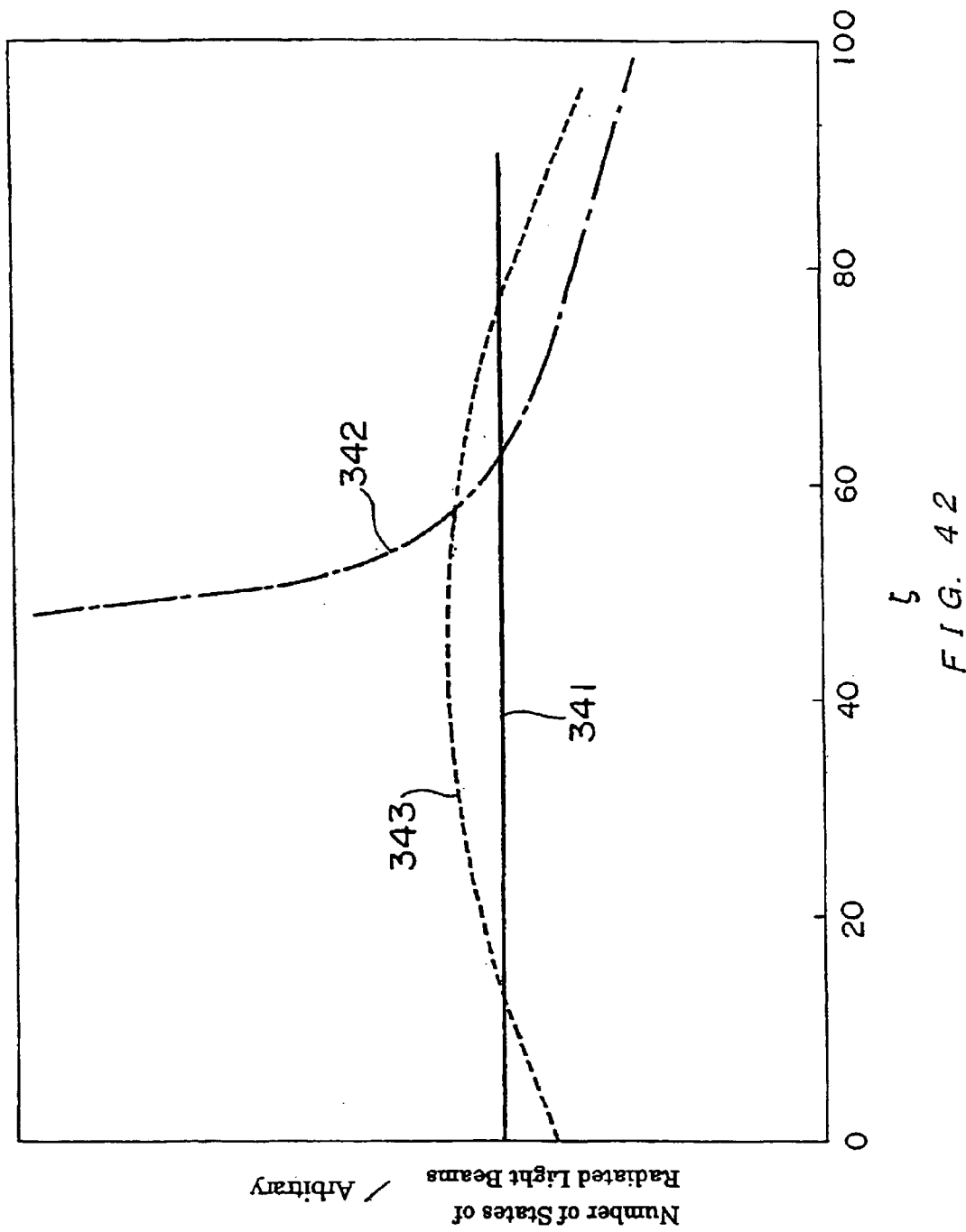
FIG. 42 is a characteristic chart showing a density of a number of states of radiated light beams in accordance with each optical system.

Therefore, if one considers a simple example of a case in which the radiated light beams from the light extracting mechanism are completely diffused light and the vertex angle of the triangular prism portion is 90°, then it is understood that in the case where a light beam 341 having the identical density of the number of states passes through the optical system of FIG. 40(a), the density of the number of states of the radiation angle of the radiated light beams 29 will be converted to a state in which many light beam components are gathered toward a forward direction and having a peak in the vicinity of 45°, as indicated by reference numeral 342 in FIG. 42, thus exhibiting great light condensation.

On the other hand, in the conventional optical system of FIG. 4(b), it is acknowledged that there is some degree of light condensation action by the triangular prism portion, but, as indicated by reference numeral 343, there are many light beam components remaining in the vicinity of 0 to 30°, which is off from the forward direction. Thus, sufficient light condensation action cannot be obtained.

That is, it is understood the optical design of the present invention, in which the light beams are radiated out to the light reflection sheet 18 side and the light guide pipe 11 itself operates as the prism sheet, performs an extremely essential role for achieving the light condensation.

As regards the pointed or corrugated unevenness (the unevenness having the corrugated surface form) 34, 35 or the lenticular lens elements 36, the form thereof is designed as needed for purposes of achieving the optical functions of increasing the light condensation and the like, and there are no particular restrictions on the surface structure. However, if the function of making the light that has entered from the side edge portion propagate without loss in accordance with all the reflection conditions, which is a function that is originally required by the light guide pipe 11, is sacrificed, the function of the planar light source device is not achieved.

Therefore, at least the ridge lines 34*a*, 35*a*, 36*a* of the pointed or corrugated unevenness 34, 35 and of the lenticular lens elements 36 are provided so as to be substantially parallel to the direction in which the incidence light beams chiefly propagate. By doing this, the pointed or corrugated unevenness 34, 35 or the lenticular lens elements 36 have an effect such that the problem of disruption of all the reflection conditions and of the light beams ceasing to propagate through the inside of the light guide pipe 11 is eliminated. That is, as shown in FIG. 37 to FIG. 39 and FIG. 41, the pointed or corrugated unevenness 34, 35 or of the lenticular lens elements 36 are in a direction that is substantially perpendicular to the side edge portion 12 to which the light source 13 is arranged.

Further, it is desirable that the pointed or corrugated unevenness 34, 35 or the lenticular lens elements 36, typified by the triangular prism array or the like, is made to be as minute as possible, to the extent that it cannot be seen, and have a pitch of at least 550 μm or less, preferably 300 μm or less, more preferably 200 μm or less.

From the perspective of light condensation and the ease of the processing, a desirable configuration is one which uses the triangular prism array 34 as shown in FIG. 37. As shown in FIG. 40(*a*), such a configuration is used in which a triangular prism array having a vertex angle δ of 60 to 150°, preferably 70 to 120°, more preferably 80to 110° is provided to the radiation surface side of the light guide pipe 11, and the ridge line 34*a* of the prism array 34 is substantially perpendicular to the side edge portion 12 provided to the light source 13.

By forming the triangular prism array 34 integrally with the light radiation surface 15 of the light guide pipe 11 in this way, the light guide pipe itself functions as a thick prism sheet as described above, so it becomes possible to achieve high light condensation easily.

Even in the light guide pipe 11 having the triangular prism array 34 formed integrally with the light radiation surface 15, the light extracting mechanism 21 for selectively radiating the light beams out to the light reflection sheet 18 is provided on the opposite surface 16 from the light radiation surface 15 of the light guide pipe 11. In the configuration such as shown in FIG. 23 and FIG. 25 in which the light extracting mechanism 21 is provided to the light radiation surface 15 of the light guide pipe 11, as shown in FIG. 41, there is provided the pointed unevenness 34 such as the triangular prism array on the opposite surface 16 from the light radiation surface 15 of the light guide pipe 11. Even in this configuration, it goes without saying that the ridge line 34*a* of the pointed unevenness 34 is faced in the direction that is substantially perpendicular to the side edge portion 12 which is the light incidence surface of the light guide pipe 11, as described above.

The radiated light beams from the light guide pipe 11, which is designed such that the pattern composed of the convex protrusions 22 is the light extracting mechanism 21 as described above and the greater part of the light flux radiated from the light guide pipe is directed toward the side on which the light reflection sheet 18 is arranged, are reflected in the direction of the normal line 17 with respect to the light guide pipe 11 due to the effect of the sloped reflection surfaces 19*a* on the light reflection sheet 18. Further, on at least one surface of the light guide pipe 11, there exists the pointed or corrugated unevenness 34, 35 or the lenticular lens elements 36 provided to improve the optical characteristics such as the light condensation. Thus, despite the extremely simple construction, it is possible to obtain an extremely high quality illumination light beam in the planar light source device 10.

Figure 43:
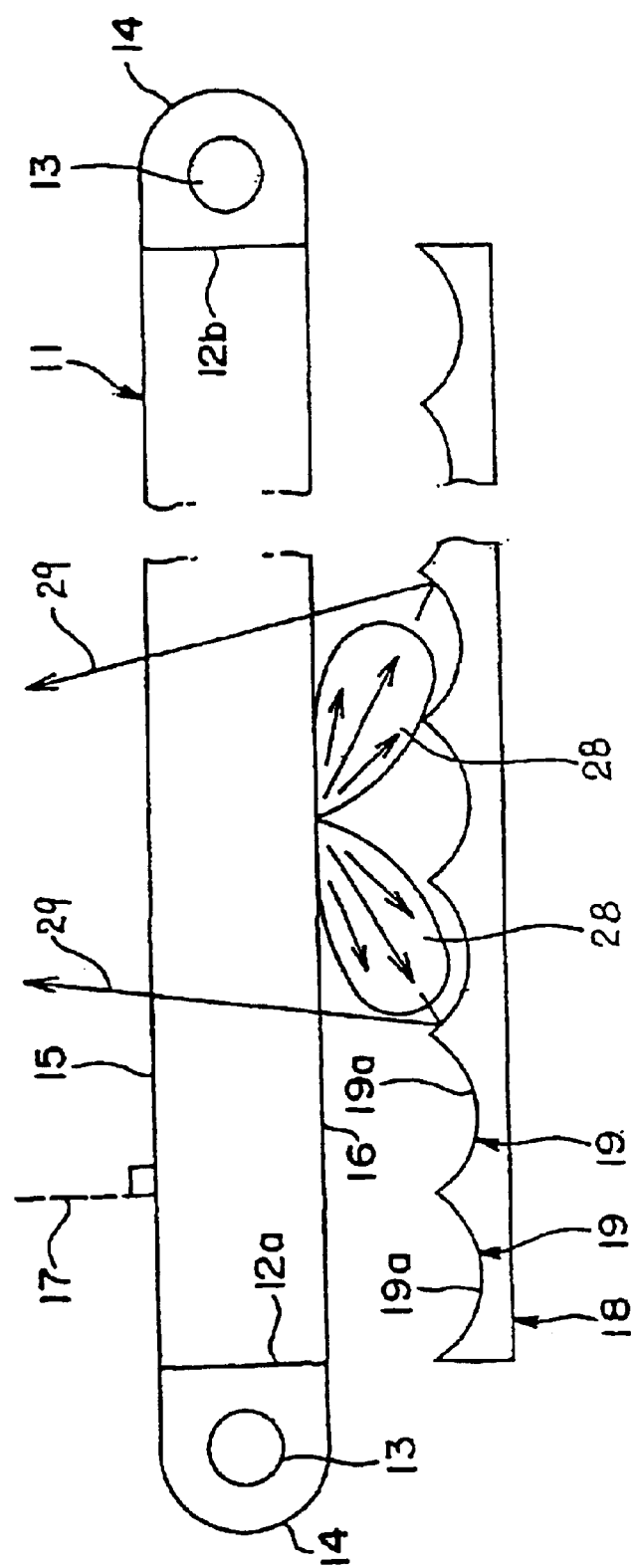
FIG. 43 is a construction explanatory diagram showing an outline of the main portion of the planar light source device according to another embodiment of the present invention.

Note that, in the case where the linear light source 13 is provided only to the side edge portion 12 of the light guide pipe 11 as in the planar light source device 10 of the embodiment shown in FIG. 1, it is desirable to use the configuration shown in FIG. 20 on the surface opposite from the light radiation surface 15, namely, it is desirable to arrange the light reflection sheet 18 formed by the array of base units 19 composed of the concave reflection surfaces 19*a* that are formed in parallel straight lines and sawtooth-shape. In the case where the linear light sources 13 are arranged to the two opposite side edge portions 12*a*, 12*b* of the light guide pipe 11 as shown in FIG. 43, it is desirable to use the configuration shown in FIG. 7 for the light reflection sheet 18, namely, it is desirable to use the light reflection sheet 18 formed by the array of base units 19 composed of the concave reflection surfaces 19*a* that are formed in parallel straight lines and corrugated-shape.

(Regarding the Material of the Light Reflection Sheet)

Figure 14:
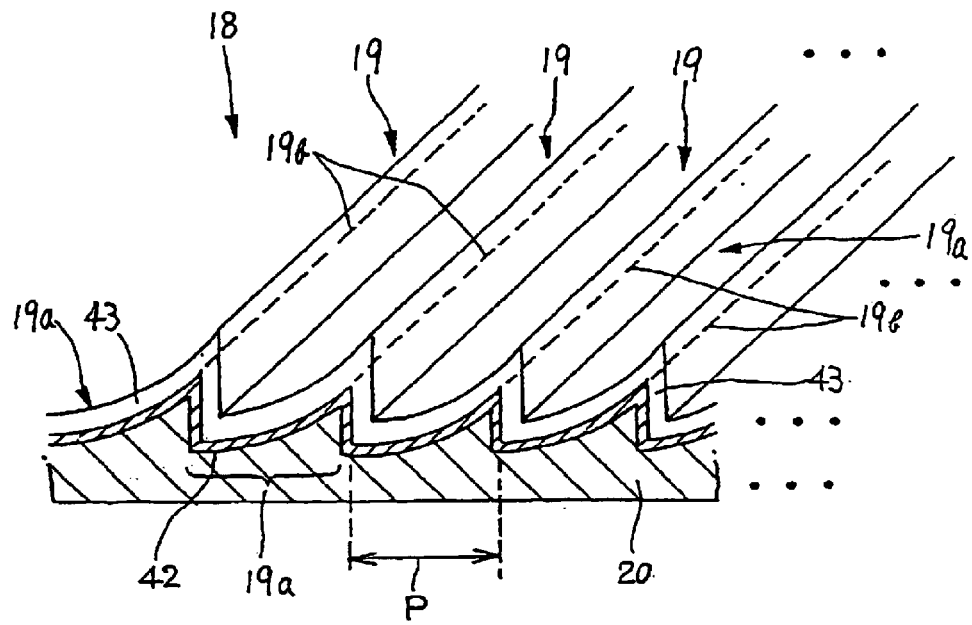
FIG. 14 is a partial perspective diagram expanding and showing the main portion of the light reflection sheet used in the planar light source device of the present invention.

There are no particular limitations on the reflective material to be used for the light reflection sheet 18 in the present invention; however, for ease of production, it is most favorable to coat the surface with silver or aluminum as shown in FIG. 14 and thus form a reflection layer 42 and use this surface as the reflection surface 19*a*. In particular, it is most preferable to use a method in which a dry process such as vacuum vapor deposition, sputtering or ion plating is used to form a thin silver reflection layer and coat the surface.

Further, the reflection layer 42 is not limited only to a reflection layer made of a metallic material with regular reflection, but rather it is also possible to use a reflection layer that is diffusely reflective, being made of polyester resin with mulled white pigments such as titania, for example. In this case, the incident light beams are scattered in various directions by the reflection surface which is diffusely reflective, so it becomes possible to expand the direction of the reflected light, and it becomes possible to expand the viewing angle of the illumination light more than in the case where a regularly reflection surface such as an Ag thin film is used.

Additionally, before performing the silver vacuum vapor deposition or the like, it is also possible to perform matte processing by conducting sandblast processing to the surface of the backing sheet to which there have been formed the substantially identical and/or substantially similar base units 19 that are composed of the sloped reflection surfaces 19*a*. By performing processing such as this, it becomes possible to give the regularly reflection surface moderate light diffusion property to obtain effects such as expansion of the distribution characteristic of the angles of the radiated light beams, suppression of glare in the illumination light beam, prevention of a moiré pattern from developing which originates in interference with the gate array of the liquid crystal cells.

Other ways of forming the diffusional reflection layer include such configurations as one in which the diffusional reflection layer is formed of a foam polyester resin, a foam polyolefin resin, a foam ABS resin or the like, and one in which the surface of the backing is coated with a paint composed of white pigments.

(Providing a Protective Layer on the Light Reflection Sheet)

The glossy metal surface of the silver reflection layer or the like can be very easily scratched, and it is in a state that oxidization and the like are easy to be occurred. Therefore, as shown in FIG. 14, it is desirable to prevent degradation of optical characteristics due to scratches and the like by, for example, painting the surface thereof with an ultra-violet, curing acrylic paint as a protective layer 43. Additionally, a coating layer of light-transmittable beads typified by glass beads or the like is provided as the protective layer 43 thereby achieving an effect identical to conducting a matte process to the above-mentioned substantially identical and/or substantially similar base units composed of the sloped reflection surfaces.

Additionally, it is also possible to give this transparent coat layer (the protective layer 43) a functionality of an optical thin film and further improve the control of the incident light beams. For example, it is possible to provide a $\lambda/4$ plate, a $\lambda/2$ plate or some other such optical thin film, and by further layering these optical thin films, it becomes possible to obtain a light reflection sheet having functions for controlling the polarization state of the incident light beams such as a function of a beam splitter and a function of a polarized light converter.

Figure 18:
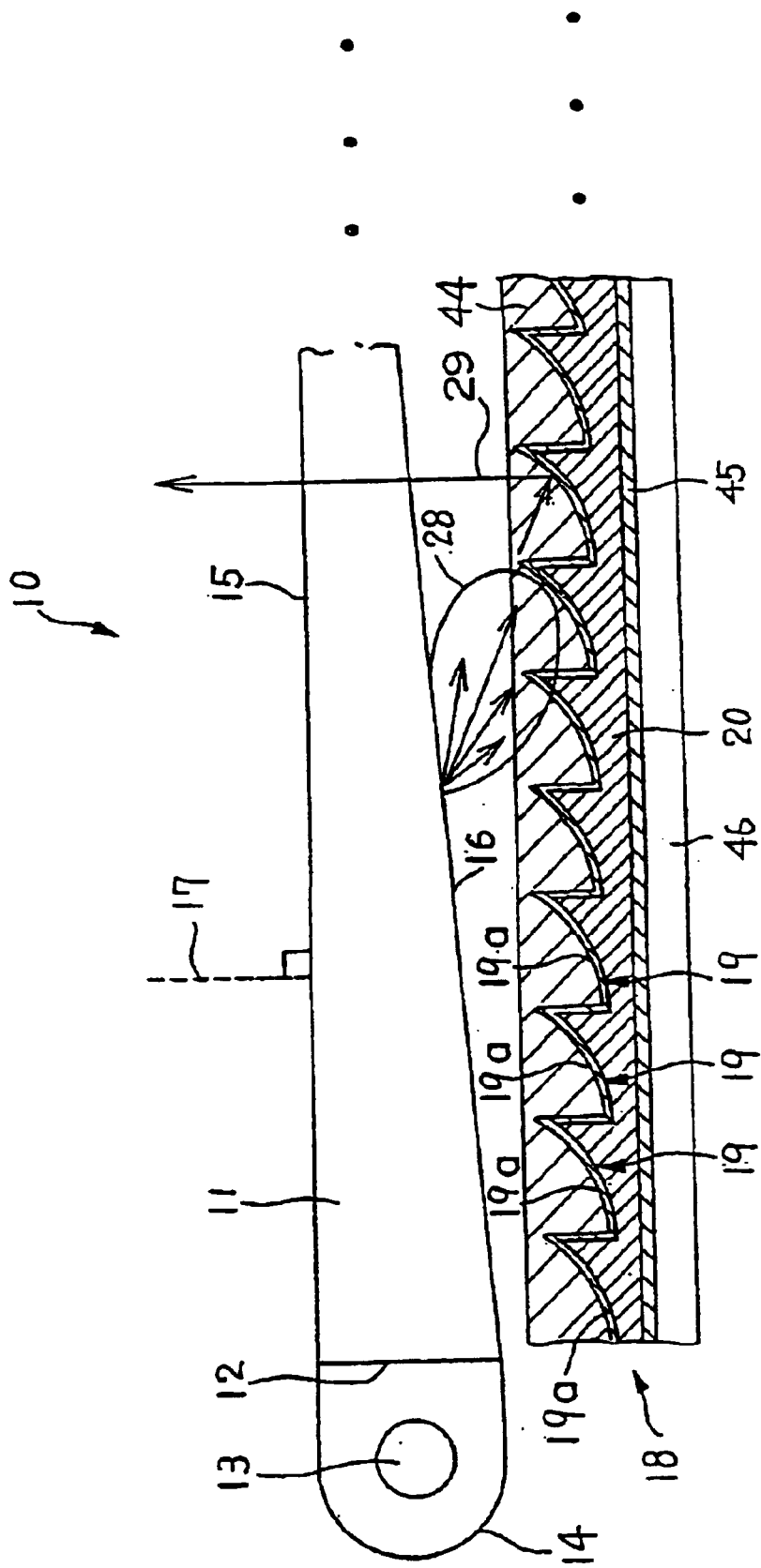
FIG. 18 is a construction explanatory diagram showing an outline of the main portion of the planar light source device in accordance with another embodiment of the present invention.

Incidentally, instead of the above-mentioned coat layer 43, a coat layer 44 with different property may be provided such that the surface becomes flat as shown in FIG. 18. To explain this coat layer 44 in further detail, when the reflection surface 19a is formed from silver or aluminum as described above, the reflection surface 19a becomes highly conductive. Accordingly, there develops a problem of inviting a leak or a short circuit with the electricity that is used to light up the light source. This is a particularly serious problem in the construction that uses a high-voltage power source to light up, of which the light source is a discharge tube such as a cold cathode tube, which is generally used in a large-scale LCD backlight, as described above.

Further, as another problem, in the case where the reflection layer 42 is formed of the regularly reflective metallic material represented by silver or aluminum, from the perspective of controlling optical characteristics such as the light condensation, it becomes extremely prone to changing through time, so there is a possibility that the optical characteristics are changed easily due to oxidization degradation on the reflection layer 42 or other such changes through time. If oxidation or other such changes through time do occur, then it can be foreseen that the optical reflection characteristics will change easily and the quality of the illumination light will become extremely difficult to be maintained. Thus, a practical planar light source device will no longer be obtainable.

Figure 19:
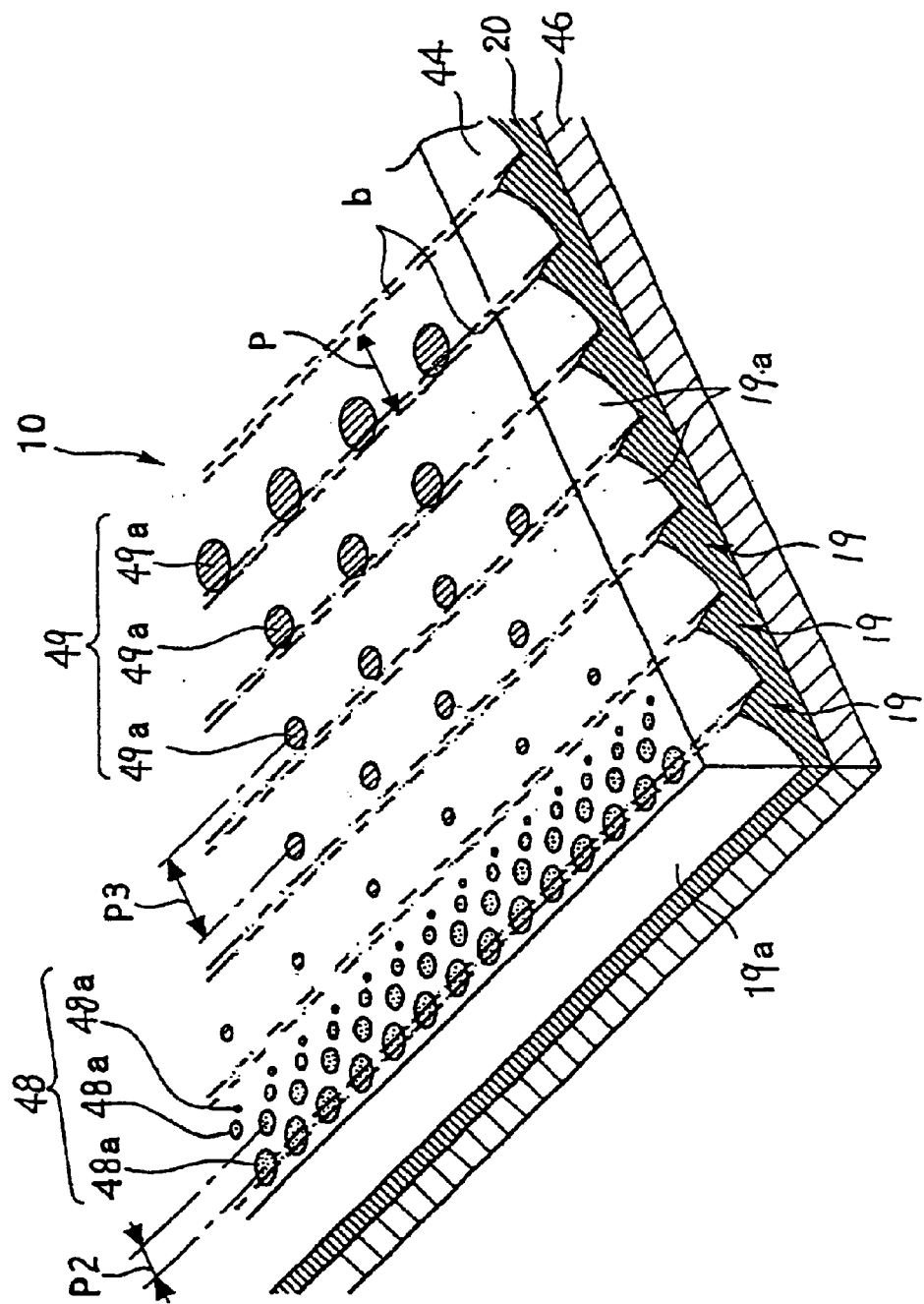
FIG. 19 is a partial perspective diagram showing the main portion in yet still another example of the light reflection sheet used in the planar light source device of the present invention.

Accordingly, it is desirable to provide the silver or aluminum reflection surface 19a with the coat layer 44 composed of a transparent insulating material. This coat layer 44 is preferably formed as shown in FIG. 18 and FIG. 19, having concave portions of the reflective surface 19a filled to be flat and smooth. The reason for making the surface of the transparent insulating material flat and smooth when it is arranged as the coat layer 44 to fill in the concave portions of the reflection surface 19a is follows.

In the LCD backlight, since it is necessary to correct bright lines and dark portions in the vicinity of the light source and perform adjustments of the overall color tone, there are many cases in which it is necessary to provide a print on the surface of the light reflection sheet. That is, a pattern 48 composed of light absorbing black dots 48a, a pattern 49 composed of light diffusing white dots 49a or the like is printed onto the light reflection sheet, thereby being capable of correcting the bright lines and dark portions in the vicinity of the light source and expanding the luminescent region which is effective for practical purposes.

However, in the case where the coat layer made of the transparent insulating material is provided to correspond to the shape of the surface of the substantially similar base units as shown in FIG. 16, the shape of the surface of the base units is left behind on the surface of the light reflection sheet, generating a "smudge" or "drag" of print ink. Therefore, in order to prevent this, it is desirable that the surface of the light reflection sheet is filled in with transparent resin or the like to be flat and smooth.

More specifically, the surface of the coat layer 44 composed of the transparent resin has an Rz value of 25 $\mu$m or less, preferably 20 $\mu$m or less, more preferably 15 $\mu$m or less as determined by JIS B0605. The insulating material for forming this coat layer 44 is preferably an alkali, a polyester or other such thermoplastic resin, a photo-curing resin, an transparent resin represented by thermosetting resin or the like, or transparent ceramic (silica, titania and the like are representative).

Further, as the coat layer 44 composed of this insulating material, in terms of degree of electrical insulation, ease of manufacturing, low costs and the like, the transparent resin is most desirable which has a resistivity of $1.0 \times 10^6$ $\Omega\cdot$cm or greater, preferably $1.0 \times 10^7$ $\Omega\cdot$cm or greater, more preferably $1.0 \times 10^8$ $\Omega\cdot$cm or greater. Further, "transparent" in the term "transparent insulating material" means a total light transmissivity of 85% or greater, preferably 87% or greater, even more preferably 90% or greater.

Further, for the print pattern, the following patterns as shown in FIG. 19 are representative: bright, belt-shaped bright portions (i.e., bright lines) and the like frequently occur in the vicinity of the light source and worsen the outward appearance, so this is corrected with the pattern 48 composed of the multiple dots 48 having light diffusing property (white) or light absorbing property (black); and in a large-size module it is easy for uneven color to develop in the surface, so this is corrected with the pattern 49 composed of the multiple, semi-translucent dots 49a.

With respect to the pattern 48 which is provided to correct the worsening of the outward appearance due to the occurrence of the belt-shaped bright portions (bright lines) in the vicinity of the light source black is the best color for the ability to correct the bright lines; however, the brightness level is easy to lower. In contrast, in the case of white, there is relatively little brightness level lowering. As shown in FIG. 19, the pattern is provided mainly concentrated in the vicinity of the side edge portion of the light reflection sheet 18 where the light source is provided; the pitch P2 of the dots 48a that form the pattern 48 is preferably 2 to 400 $\mu$m, more preferably 5 to 300 $\mu$m, even more preferably 10 to 200 $\mu$m; the pattern is provided within a range of 30 mm from the side edge portion 12, preferably within 25 mm, more preferably within 20 mm therefrom; and the density of the arrangement thereof gradually decreases further away from the edge on the side where the light source is provided.

On the other hand, the pattern 49, which is composed of the multiple semi-translucent dots 49 used to correct the color unevenness in the surface of the large-size module, is provided across a wide range of the light reflection sheet 18, and the density of the arrangement thereof increases gradually further away from the edge on the side where the light source is provided. Representatively, since it is well known that there is a tendency for the blue color to grow too strong around the vicinity of the light source, a configuration is given in which a slightly blue light-transmissive ink is printed in such a way that the density of the arrangement of the ink increases further away from the light source 13. In this case as well, the dots 49 which form the pattern 49 are arranged at a pitch P3 that is preferably 2 to 400 μm, more preferably 5 to 300 μm, even more preferably 10 to 200 μm.

Further, for the coat layer 44, which is made of the light-transmissive material and provided to the light reflection sheet 18, it is possible to use a light-scattering material composed of a material having a different refractive index. The material can be endowed with this effect by dispersing inorganic particles such as titania or the like into the alkali photo-curing resin that is preferably used as the material for forming the light-transmissive coat layer 44. The light-scattering is thus made to occur, and the light beams that entered the light reflection sheet are moderately scattered. Accordingly, the control of the illumination light beam can be further increased.

According to the planar light source device of the present invention, the transmissive material coating is applied so as to completely fill in the substantially similar base units 19, the light reflection sheet 18 is formed to be flat and smooth such that the shape of the base units 19 is not reflected onto the surface of the coat layer 44, and this light reflection sheet 18 is used in the planar light source device 10, whereby it becomes possible to print the extremely minute patterns 48, 49 onto the surface of the light reflection sheet 18. Therefore, it becomes possible to perform improvements of the optical characteristics, which are extremely important for practical purposes, for example, preventing the occurrence of the bright portions in the vicinity the light source, and correcting color unevenness in the case where the device is large-sized.

In a preferable configuration of the present invention, the light reflection sheet 18 is formed of a resin material. In particular, it is formed of the backing 20 being composed of a thermoplastic resin film, represented by polyester resins, acryl resins, polycarbonate resins, polyamide resins, polyarylate resins, cyclopolyolefin resins or the like, and for the formation of the array of the concave reflection surfaces, it is preferable to implement formation by hot press molding or by using a photo-curing resin.

When this is performed, it is preferable, for production reasons, to apply an embossing process using a thermal roll of a thermoplastic resin film, represented by polycarbonate, polyester, polyalylate or the like. Further, the sheet made of the simple thermoplastic resin film lacks rigidity in the case where it is used in the LCD backlight, so crumpling of the sheet becomes a problem. That is, crumpling in the sheet makes unevenness in the level of brightness grow worse, thus generating a problem of deterioration of the outward appearance.

As a measure for dealing with this problem, on the surface of the thermoplastic resin film (i.e., the surface on the opposite side from the side on which the reflection surfaces are formed), it is desirable to use an adhesive 45 to apply a drawing film 46, typified by biaxial draw polyester and biaxial draw polypropylene, and thus adopt a construction that guarantees the necessary rigidity. Note that, adherence of the backing 20, that is, the thermoplastic resin film, and the drawing film 46 may also be performed by fusion in addition to using the adhesive 45.

The light reflection sheet 18 as above can be used also as a screen for image projection in a projector device or the like. That is, when the light reflection sheet is used as an image projection screen, only the light beam components which contribute to the display from the projector device are projected in the direction of a viewer, and exterior light from a window, for example, is not projected into the screen. Therefore, even if the image is not projected in a room that has been made dark, as was done conventionally, it is still possible to obtain an image exhibiting extremely high contrast, and a superior screen for practical purposes can thus be obtained. In particular, it is extremely preferable for use in showroom exhibitions, in-flight projections, and the like, becoming possible to provide vivid display images even in an environment in which the surroundings are bright.

(Explanation of the Liquid Crystal Display Device Using the Planar Light Source Device)

In the present invention, the liquid crystal display device is a device which makes use of electroptical effects of liquid crystal molecules, namely optical anisotropy (refractive index anisotropy), orientation and the like, changes orientation status of the liquid crystals in freely chosen display units by applying an electric field or by allowing electric current flow, and uses liquid crystal cells which are an arrangement of optical shutters driven by altering the light transmissivity and the reflectivity.

Specifically, the liquid crystal display elements can be given: a transmissive simple matrix drive supertwisted nematic mode; a transmissive active matrix drive twisted nematic mode; a transmissive active matrix drive in-plane switching mode; a transmissive active matrix drive muitiple-domain vertical-aligned mode; and the like.

By constructing the liquid crystal display device with the planar light source device of the present invention being used as a light source means for the backlight of the liquid crystal display elements, due to the effect of the planar light source device using the above-mentioned light reflection sheet, it becomes possible to obtain a liquid crystal display device in which the device is thinned (i.e., there are a few sheets), image quality is improved, particularly there are a few bright lines, construction is simple and assembly is improved, even yield is high, and costs are also decreased.

Hereinafter, more detailed explanation will be made according to embodiments of the present invention; however, the present invention is not limited to the following embodiments, provided that the essence thereof is not exceeded.

(Embodiment 1)

For the light guide pipe 11, there is used a 350.0×285.0 mm acryl resin having a 2.66 mm thick portion and 0.6 mm thin portion, being wedge-shaped along a short side direction thereof, on a long side of a thicker side thereof, there is provided the linear light source 13 being composed of the cold cathode tube, and the cross-sectionally triangular protrusions 23 are provided at a pitch which becomes gradually narrower away from the linear light source 13. The light guide pipe 11 provided with the cross-sectionally triangular protrusions 23 is obtained by using a mold that has been mirror polished and cut with a diamond cutting tool, and by casting acryl resin according to a standard method of injection molding.

The cross-sectionally triangular top angle in the protrusions 23 is made to be 30°, the protrusion amount of the protrusions 23 is made to be 35.0 μm, the cross-sectionally triangular protrusions 23 are provided to the light reflection sheet 18 side as shown in FIG. 29(*a*), and thus a construction is made such that substantially all of the light beams radiated from the light guide pipe 11 are directed toward the side of the light reflection sheet 18. The effect of the light extracting mechanism 21 composed of the cross-sectionally triangular protrusions enables the achievement of the light guide pipe from which 77% of the light flux radiated out from the light guide pipe 11 is radiated toward the light reflection sheet 18 side, and which is favorably used in the present invention.

As the light reflection sheet, there was used the light reflection sheet 18 in which the base units 19 are composed of flat sloped reflection surfaces 19a formed as shown in FIGS. 4(*a*)(*b*) in parallel straight lines and arranged such that ridge lines 19b are lined up in parallel. The pitch thereof is set at 220 μm, the silver sputtering layer is used on the reflection layer, and the acryl resin is coated onto the surface of this silver sputtering layer. The slope angle α of the sloped reflection surfaces 19a is made to be 24°, and thus, an optical system is obtained in which the light beams obtained by the light extracting mechanism 21 composed of the cross-sectionally triangular protrusions and radiated out from the light guide pipe 11 toward the light reflection sheet 18 side is altered in direction by the light reflection sheet 18 and the light beams radiate out in the direction of the normal line 17 with respect to the light guide pipe 11.

For the light source 13, there was used the cold cathode tube having a tube diameter of 2.2 mm, which is lit up at a high frequency through an inverter, and directly above the light radiation surface 15 of the light guide pipe 11, there is arranged a light dispersion sheet produced by coating acrylic beads having a haze of 47.2%, and thus the planar light source device was obtained. When tube current was set at 6 mA and a brightness measuring device (manufactured by Topcom, BM-7) was used to measure an average brightness from 25 points in the surface, an average value of 1580 nit was obtained. Thus, it was confirmed that both the brightness performance and the brightness unevenness exhibit sufficient optical characteristics for practical use as the light source for the backlight in the liquid crystal display panel.

Further, since the prism sheet which is normally arranged therein is not used, contamination of dust between sheets, or the like is minimal, and assembling property is satisfactory. Further, due to the effect produced by the light reflection sheet 18, the bright lines which were generated in the conventional-type planar light source device and which appeared in the vicinity of the light source were eliminated, so image quality was superior.

(Embodiment 2)

For the light guide pipe 11, there is used a 200.00×190.0 mm wedge-shaped acrylic plate having a thickness of 2 mm in the vicinity of the light source 13 and 0.6 mm at a farthest position from the light source 13, the thickness thereof changing along a short side direction, and on a thicker portion thereof, there is provided the linear light source 13 composed of the cold cathode tube, and on the light guide pipe 11, there are formed the convex protrusions 22 having square openings and being patterned such that the density of the arrangement becomes relatively greater further away from the linear light source 13. The depth h of the convex protrusions 22 is 30.0 μm, and the width of the openings Wmin of the convex protrusions 22 is 35.0 μm.

Here, the mold to be used in the formation of the convex protrusions 22 is obtained by laminating a dry film resist having a thickness of 30 μm onto a glass plate, forming a pattern by means of photolithography and vapor depositing an electrode onto the glass plate which has been patterned with the dry film resist, and then this is used as a master to produce the mold by means of nickel electroformation.

The convex protrusions 22, which are the light extracting mechanism 21 of the light guide pipe 11, are provided to the side where the light reflection sheet 18 is provided, and with the effect that the convex protrusions 22 having the above-mentioned form are made to be the light extracting mechanism 21, there can be obtained the light guide pipe from which 82% of the light flux radiated out from the light guide pipe 11 is radiated toward the light reflection sheet 18 side and which is favorably used in the present invention.

For the light reflection sheet 18, there was used the light reflection sheet 18 in which the base units 19 are composed of flat sloped reflection surfaces 19a formed as shown in FIGS. 4(*a*) (*b*) in parallel straight lines and arranged such that ridge lines 19b are lined up in parallel. The pitch of the base units 19 is set at 100 μm; polyester is used for the base sheet to which the sloped reflection surfaces that are formed in parallel straight lines and are flat and smooth are formed; the processing for the sloped reflection surfaces is performed using the mold and then the surface is then roughened by performing sandblasting; and then the reflection layer is formed by performing vapor deposition of the silver. The slope angle α of the sloped reflection surfaces is made to be 25°, and thus, an optical system is obtained in which the light beams 28 obtained by the light extracting mechanism 21 composed of the convex protrusions 22 and radiated out from the light guide pipe 11 toward the light reflection sheet 18 side is altered in direction by the light reflection sheet 18 and the light beams radiate out in the direction of the normal line 17 with respect to the light guide pipe 11.

For the light source 13, there was used the cold cathode tube having a tube diameter of 2.0 mm, which is lit up at a high frequency through an inverter, and directly above the light radiation surface 15 of the light guide pipe 11, there is arranged a light dispersion sheet produced by coating acrylic beads having a have of 45%, and thus the planar light source device was obtained. When the tube current was set at 6 mA and the brightness measuring device (manufactured by Topcom, BM-7) was used to measure the average brightness from 25 points in the surface, an average brightness of 1450 nit was obtained, and thus, it was confirmed that both the brightness performance and the brightness unevenness exhibit sufficient optical characteristics for practical use as the light source for the backlight in the liquid crystal display panel.

Further, since the prism sheet, of which 2 pieces are normally arranged, is not used, contamination of dust between sheets, or the like is minimal, and assembling property is improved as well. Additionally, since there are no extra sheets, the planar light source device which is thin and light-weight can be obtained. Further, due to the effect produced by the light reflection sheet 18, the bright lines which were generated in the conventional-type planar light source device and which appeared in the vicinity of the light source and required a special measure were eliminated, so image quality was extremely superior. Furthermore, since the surface of the light reflection sheet has been made rough with sandblasting, a glare from light beams radiated in a particular direction disappears. Thus, the quality of the illumination light is extremely superior as the light source for the backlight in the liquid crystal display panel.

(Embodiment 3)

For the light guide pipe 11, there is used a 45.0×37.0 mm acrylic plate having a thickness of 1 mm, the linear light source 13 composed of a white LED is provided to a corner portion thereof, and on the light radiation surface 15 side of the light guide pipe 11, there is provided the light extracting mechanism 21 which is composed of cross-sectionally pointed protrusions 27 such as shown in FIG. 25 being arranged such that the pitch P thereof becomes gradually narrower further away from the corner portion at which the light source 13 is arranged. The top angle θ of the cross-sectionally pointed protrusions 27 is 15°, and a base of the protrusions 27 has a width of 70 μm.

The formation of the light guide pipe 11, in which there is formed the light extracting mechanism 21 composed of the cross-sectionally pointed protrusions 27 as described above, is achieved by means of injection molding processing which is executed using the mold that has been treated with processing for creating a corresponding form, and cutting processing performed by means of a diamond cutting tool is used for the processing for applying the form onto the surface of the mold. With the effect that the cross-sectionally pointed protrusions 27 are provided to the light radiation surface 15 side of the light guide pipe 11 to act as the light extracting mechanism 21, there can be obtained the light guide pipe from which 72% of the light flux radiated out from the light guide pipe 11 is radiated toward the light reflection sheet 18 side and which is favorably used in the present invention.

For the light reflection sheet 18, there was used the light reflection sheet in which the base units 19 are composed of the reflection surfaces 19a formed as shown in FIG. 9 and being concaved-surface mirrors. A maximum diameter of the concaved-surface mirrors is set at 70 μm, the silver sputtering layer is used on the reflection layer, and the acryl resin containing beads therein is coated onto the surface of this silver sputtering layer. The slope angle a of the sloped reflection surfaces 19a is made to be 18°, and thus, an optical system is obtained in which the light beams obtained by the light extracting mechanism 21 composed of the cross-sectionally pointed protrusions provided on the light radiation surface 15 side of the light guide pipe 11 and radiated toward the light reflection sheet 18 side is altered in direction by the light reflection sheet 18 and the output light beams radiate out in the direction of the normal line 17 with respect to the light guide pipe 11.

For the light source 13, there was used a chip-type white LED having an outer form of 2.0×3.0×1.6 mm, and this was lit up at a forward voltage of 3.3 V, thereby obtaining the planar light source device using the white LED as the light source. When the brightness measuring device (manufactured by Topcom, BM-7) was used to measure an average brightness from 5 points in the surface, an average brightness of 220 nit was obtained, and thus, it was confirmed that both the brightness performance and the brightness unevenness exhibit sufficient optical characteristics for use as the light source for the backlight in a liquid crystal display panel for a portable telephone.

Further, since the prism sheet which is normally used is not utilized, assembling property becomes extremely satisfactory. Additionally, since there are no extra sheets, the planar light source device which is thin and light-weight can be obtained. Further, due to the effect produced by the acrylic beads coated onto the surface of the light reflection sheet, the glare in the illumination light was improved. Thus, the planar light source device can be obtained which is extremely simple in construction and can endure practical use even if the liquid crystal panel is installed directly on the light guide pipe 11.

(Embodiment 4)

The planar light source device is obtained with the same manner as in Embodiment 1 except for the point that the base units 19 are composed of the sloped reflection surfaces 19a having their ridge lines arrayed in parallel and being formed in parallel straight lines, and the light reflection sheet 18 is used with the cross-sectional shape of the base units 19 being concaved. The effect of the cross-sectionally concave sloped reflection surfaces makes the light flux emitted to the light reflection sheet side get concentrated at the same time deflected in the direction of the normal line 17 in relation to the light guide pipe 11. As a result, the average brightness increased to 1769 nit in comparison with Embodiment 1. The practical utility as the planar light source device is extremely high, as in Embodiment 1.

(Embodiment 5)

For the light guide pipe 11, there is used a 210.0×190.0 mm wedge-shaped acrylic plate having a thickness of 2 mm in the vicinity of the light source and 0.6 mm at a farthest position from the light source, the thickness thereof changing along a short side direction, and on a thicker portion thereof, there is provided the linear light source composed of the cold cathode tube, and on the light guide pipe 11, there are formed the convex protrusions 20a having elliptical openings and being patterned such that the length along the direction of a single axis thereof relatively greater further away from the linear light source. FIG. 30 is an enlarged diagram of the convex protrusion 22.

The depth h of the convex protrusions 22 is 50.0 μm, and the minimal width of the openings Wmin of the convex protrusions when viewed at a cross-section of the direction that is perpendicular to the linear light source is 55.0 μm. Here, the mold to be used in the formation of the convex protrusions 22 is obtained by laminating a dry film resist having a thickness of 50 μm onto a glass plate, forming a pattern by means of photolithography and vapor depositing the electrode onto the glass plate which has been patterned with the dry film resist, and then this is used as the master to produce the mold by means of nickel electroformation.

In order to further improve the light condensation by the light guide pipe 11, on the side of the light guide pipe 11 to which the light extracting mechanism 21 that is composed of the convex protrusions 22 is not provided, there is formed the prism array 34 as shown in FIG. 37, having top angles of 90° and a pitch of 50 μm. The ridge lines of this prism array 34 are arranged so as to be perpendicular to the side edge portion 12 where the linear light source 13 is arranged.

The convex protrusions 22, which are the light extracting mechanism 21 of the light guide pipe 11, are provided to the side where the light reflection sheet 18 is provided, and with the effect that the convex protrusions 22 having the above-mentioned form are made to be the light extracting mechanism 21, the light guide pipe can be obtained from which 74% of the light flux radiated out from the light guide pipe 11 is radiated toward the light reflection sheet 18 side and which is favorably used in the present invention.

For the light reflection sheet, there was used the light reflection sheet 18 in which the base units 19 are composed of the sloped reflection surfaces 19a formed as shown in FIG. 6 and formed in parallel straight lines, and arranged such that the ridge lines thereof are lined up in parallel. The pitch thereof is set at 100 μm, the silver sputtering layer is used on the reflection layer (surface), and the acrylic resin coating is applied to the surface of the silver sputtering layer. The slope angle α of the sloped reflection surfaces 19a is made to be 27°, and thus, an optical system is obtained in which the light beams obtained by the light extracting mechanism 21 composed of the convex protrusions 22 and radiated out from the light guide pipe 11 toward the light reflection sheet 18 side is altered in direction by the light reflection sheet 18 and the light beams radiate out in the direction of the normal line with respect to light guide pipe 11.

For the light source 13, there was used the cold cathode tube having the tube diameter of 2.0 mm, which is lit up at a high frequency through the inverter, and directly above the light radiation surface 15 of the light guide pipe 11, there is arranged a light dispersion sheet 47 produced by coating acrylic beads having a haze of 42%, and thus the planar light source device was obtained. When the tube current was set at 6 mA and the brightness measuring device (manufactured by Topcom, BM-7) was used to measure the average brightness from 25 points in the surface, an average brightness of 1820 nit was obtained, and thus, it was confirmed that both the brightness performance and the brightness unevenness exhibit sufficient optical characteristics for practical use as the light source for the backlight in the liquid crystal display panel.

Further, since the prism sheet, of which 2 pieces are normally arranged, is not used, contamination of dust between sheets, or the like is minimal, and assembling property is extremely satisfactory. Additionally, since there are no extra sheets, the planar light source device which is thin and light-weight can be obtained. Further, due to the effect produced by the light reflection sheet 18, the bright lines which were generated in the conventional-type planar light source device and which appeared in the vicinity of the light source and required a special measure were eliminated, so image quality was superior.

(Embodiment 6)

For the light guide pipe 11 there is used a 45.0×37.0 mm acrylic plate having a thickness of 1 mm, the linear light source 13 composed of a white LED is provided to a corner portion thereof, and on the light guide pipe 11, there are formed the convex protrusions 22 having the diamond-shaped openings, and being patterned such that the length along a direction of a single axis grows relatively greater further away from the corner portion where the light source 13 is arranged. FIG. 31(b) is an enlarged diagram of the convex protrusion 22.

The depth h of the convex protrusions 22 is 27.0 $\mu$m, and the minimal width of the openings Wmin of the convex protrusions 22 when viewed at a cross-section of the direction that is perpendicular to the linear light source 13 is 31.0 $\mu$m. Here, as in Embodiments 1 and 2, the mold to be used in the formation of the convex protrusions 22 is obtained by vapor depositing the electrode onto the glass plate which has been patterned with the dry film resist, and then this is used as the master to produce the mold by means of nickel electroformation.

In order to further improve the light condensation of the light guide pipe 11, on the side of the light guide pipe 11 to which the light extracting mechanism 21 that is composed of the convex protrusions 22 is not provided, there is formed the prism array 34 having the top angles of 90° and a pitch of 50 $\mu$m. The ridge lines of the prism array are arranged so as to be perpendicular to the side edge portion where the white LED light source is arranged.

The convex protrusions 22, which are the light extracting mechanism 21 of the light guide pipe 11, are provided to the side where the light reflection sheet 18 is provided, and with the effect that the convex protrusions 22 having the above-mentioned shape are made to be the light extracting mechanism 21, there can be obtained the light guide pipe from which 72% of the light flux radiated out from the light guide pipe 11 is radiated toward the light reflection sheet 18 side and which is favorably used in the present invention.

For the light reflection sheet 18, there was used the light reflection sheet 18 in which the base units 19 are composed of the reflection surfaces 19a formed as shown in FIG. 9 and having the concaved mirror shape. The maximum diameter of the concave mirror portions is set at 70 $\mu$m, and the silver sputtering layer is used on the reflection layer (surface), and the acrylic resin containing beads is coated onto the surface of the silver sputtering layer. The slope angle $\alpha$ of the sloped reflection surfaces 19a is made to be 24°, and thus, an optical system is obtained in which the light beams obtained by the light extracting mechanism 21 composed of the convex protrusions 22 are radiated out from the light guide pipe 11 toward the light reflection sheet 18 side is altered in direction by the light reflection sheet 18 and the light beams radiate out in the direction of the normal line with respect to the light guide pipe 11.

For the light source, there was used the chip-type white LED having the outer form of 2.0×3.0×1.6 mm, and this was lit up at a direct voltage of 3.3 V, thereby obtaining the planar light source device using the white LED as the light source. When the brightness measuring device (manufactured by Topcom, BM-7) was used to measure an average brightness from 5 points in the surface, an average brightness of 430 nit was obtained, and thus, it was confirmed than both the brightness performance and the brightness unevenness exhibit sufficient optical characteristics for use as the light source for the backlight in a portable-type liquid crystal display panel.

Further, since the prism sheet which is normally used is not utilized, assembling property becomes extremely satisfactory. Additionally, since there are no extra sheets, the planar light source device which is thin and light-weight can be obtained. Further, due to the effect produced by the acrylic beads coated onto the surface of the light reflection sheet 18, the glare in the illumination light was improved. Thus, the planar light source device which is extremely simple in construction and can endure practical use even if the liquid crystal panel is installed directly on the light guide pipe 11.

(Embodiment 7)

The patterning is modified in the planar light source device described in Embodiment 5, and a patterning shape shown in FIG. 20 is used, in which the distribution density of identically formed convex protrusions 22 increases further away from the linear light source 13. The convex protrusions 22 having a depth of 50 $\mu$m and openings having a square shape with the minimum opening width Wmin of 55 $\mu$m and the maximum opening width Wmax of 55$\mu$m are used.

By using the above-mentioned patterning shape, the ability to selectively radiate the light toward the light reflection sheet 18 side as shown in FIG. 32(c) is increased, and the light guide pipe can be obtained from which 88% of the light flux is radiated out from the light guide pipe 11 toward the light reflection sheet 18 side and which is extremely favorably used in the present invention. The average brightness of 2150 nit was obtained from 25 points in the surface, and the practicality of the planar light source device was extremely high as in Embodiment 2.

INDUSTRIAL APPLICABILITY

The planar light source device of the present invention can be used favorably as the backlight optical system in a liquid crystal display device such as a monitor for a personal computer or a thin television, for example.

What is claimed is:

1. A planar light source device, comprising:
   a light guide pipe with one surface thereof serving as a light radiation surface;
   a light extracting mechanism provided to the light guide pipe;
   a light source provided to a side edge portion of said light guide pipe; and
   a light reflection sheet arranged to an opposite surface side from said light radiation surface of said light guide pipe, wherein said light extracting mechanism serves as a mechanism for radiating out, toward the light reflection sheet side, at least 65% or more of light beams radiated out from said light guide pipe, and said light reflection sheet is formed with an arrangement of multiple substantially identical and/or substantially similar base units composed of sloped reflection surfaces at a pitch of 5000 µm or less.

2. A planar light source device according to claim 1, wherein at least on one surface of said light guide pipe, there is provided corrugated unevenness having a pitch of 500 µm or less, and ridge lines of said corrugated unevenness are set in a direction that is substantially perpendicular to said light guide pipe side edge portion where said light source is arranged.

3. A planar light source device according to claim 1, wherein said light extracting mechanism is formed by a pattern in which there are arranged multiple convex protrusions provided to the opposite surface side from said light radiation surface of said light guide pipe.

4. A planar light source device according to claim 3, wherein a value h/Wmin defined by a depth h of said convex protrusions and a minimum opening width Wmin, is 0.5 or greater.

5. A planar light source device according to claim 2, wherein said light extracting mechanism is formed by a pattern in which there are arranged multiple convex protrusions provided to the opposite surface side from said light radiation surface of said light guide pipe.

6. A planar light source device according to claim 5, wherein a coat layer made of a transparent insulating material is provided on said light reflection surface.

7. A planar light source device according to claim 6, wherein said metallic material is silver or aluminum, and said coat layer made of the transparent insulating material is composed of a transparent material having a resistivity of $1.0 \times 16^6$ Ω·cm or greater.

8. A planar light source device according to claim 6, wherein a surface of said coat layer composed of a light-transmissive material which is provided on said light reflection surface is a flat and smooth surface.

9. A planar light source device according to claim 6, wherein a printed pattern is provided on the flat and smooth surface of said coat layer.

* * * * *